United States Patent [19]

Narita et al.

[11] Patent Number: 4,727,490

[45] Date of Patent: Feb. 23, 1988

[54] RUNNING CONTROL DEVICE IN CARGO HANDLING VEHICLES

[75] Inventors: Toshihide Narita, Obu; Masatoshi Yamada, Nagoya; Eiichi Yasuda, Seto, all of Japan

[73] Assignees: Kabushiki Kaisha Toyoda Jidoshokki Seisakusho, Kariya; Kabushiki Kaisha Toyota Chuo Kenkyusho, Nagakute, both of Japan

[21] Appl. No.: 708,258

[22] Filed: Mar. 5, 1985

[30] Foreign Application Priority Data

Mar. 7, 1984 [JP] Japan ................................ 59-44280
Mar. 7, 1984 [JP] Japan ................................ 59-44281
Mar. 7, 1984 [JP] Japan ................................ 59-44282

[51] Int. Cl.⁴ ............................................. B60K 41/18
[52] U.S. Cl. ................................. 364/424.1; 74/859; 74/866; 60/431
[58] Field of Search .............. 60/431; 417/34; 74/859, 74/860, 866; 364/424.1

[56] References Cited

U.S. PATENT DOCUMENTS

| | | | |
|---|---|---|---|
| 4,124,095 | 11/1978 | Ezure | 60/431 |
| 4,373,850 | 2/1983 | Durham | 60/431 |
| 4,459,806 | 7/1984 | Falk | 60/431 |
| 4,509,125 | 4/1985 | Fattic et al. | 74/866 |
| 4,543,855 | 10/1985 | Oetting et al. | 74/859 |
| 4,564,906 | 1/1986 | Stephan et al. | 74/859 |
| 4,596,118 | 6/1986 | Heiser | 60/431 |

FOREIGN PATENT DOCUMENTS

| | | | |
|---|---|---|---|
| 2700803 | 7/1978 | Fed. Rep. of Germany | 60/431 |
| 58-72762 | 4/1983 | Japan . | |
| 58-96143 | 8/1983 | Japan . | |
| 8145525 | 8/1983 | Japan . | |

*Primary Examiner*—Parshotam S. Lall
*Attorney, Agent, or Firm*—Brooks Haidt Haffner & Delahunty

[57] ABSTRACT

A control device for use in a cargo handling vehicle in which a single power plant provides both the vehicle drive and the power to the cargo handling device has a continuously variable transmission. The cargo handling device is actuated by means of a hydraulic pump. Whether or not the cargo handling device is in operation the operator need not adjust the degree of depression of a drive pedal to maintain constant vehicle speed because automatic compensation means are provided for that purpose. The demands upon the vehicle operator are accordingly reduced.

53 Claims, 15 Drawing Figures

RUNNING CONTROL DEVICE IN CARGO HANDLING VEHICLES

BACKGROUND OF THE INVENTION

1. Field of the Invention

This invention relates to a running control device in cargo handling vehicles and, particularly, to a novel running control device in a cargo handling vehicle having one power plant for both rotating the driving wheels of the vehicle via a continuously variable transmission and driving a cargo handling hydraulic pump, which changes the speed ratio of the continuously variable transmission to control the running speed of the cargo handling vehicle.

2. Description of the Prior Art

Heretofore, some cargo handling vehicles equipped with a cargo handling device, such as a fork lift truck or a shovel loader, etc., had one engine, functioning as a power plant, for rotating the driving wheels via a continuously variable transmission and for driving a cargo handling hydraulic pump. In these types of cargo handling vehicles, the continuously variable transmission was of the torque converter type and the static hydraulic type.

In the case of the torque converter type vehicle, when it is desired to perform the cargo handling work while the vehicle is running at a low speed, an accelerator pedal must be stepped on to rev up the engine because the rate of revolution of the cargo handling hydraulic pump must be increased for that work. If so accelerated, the vehicle speed goes up as the revolution rate increases. To overcome such inconveniences, the vehicle speed was adjusted so as not to increase by depressing an inching pedal in the past. Accordingly, the cargo handling manipulation while the vehicle is running was troublesome and required a skill, and it was very difficult to perform the cargo handling work while compensating for a variation in vehicle speed caused by the cargo handling manipulation.

In the case of the cargo handling vehicle having the static hydraulic type continuously variable transmission, the vehicle speed was maintained constant by revving up the engine and, at the same time, by bringing down the speed ratio through manipulation of a swash plate manipulation pedal, or the vehicle speed was adjusted by means of the swash plate manipulation pedal while keeping the engine in the revved-up state irrespective of the conditions of running or cargo handling. However, even in this case, similarly to the above case, it was very difficult to perform the cargo handling work while compensating for a variation in vehicle speed caused by the cargo handling manipulation, and there was a problem relating to noise or fuel consumption because the engine was revved-up irrespective of either the running condition or cargo handling work.

SUMMARY OF THE INVENTION

It is the object of the present invention to provide a control device in cargo handling vehicles which can prevent a variation in vehicle speed, reflecting the cargo handling manipulation, from appearing without need for high skill if the cargo handling manipulation is performed while the vehicle is running, and which can improve the problems of noise and fuel consumption.

In order to achieve the above object, the gist of the present invention resides in a control device in a cargo handling device equipped with a cargo handling device and a power plant for driving both a cargo handling hydraulic pump of the cargo handling device and the vehicle through a continuously variable transmission, which comprises a vehicle drive control device, a first operation means for computing a relation of variation between a value in response to a rate of revolution of the power plant based on operation of a cargo handling manipulation device while the vehicle is running and another value in response to a rate of revolution of the power plant before that cargo handling operation, a second operation means for computing a speed ratio of the continuously variable transmission on the basis of the relation of variation among these values in response to the rate of revolution or speed of the power plant to compensate for a variation in vehicle speed based on the operation of the cargo handling manipulation device, and a control means for controlling the speed ratio of the continuously variable transmission by the computed speed ratio.

In brief, according to the first aspect of the present invention, in case the cargo handling operation is to be performed or altered in duty while the vehicle is running, the vehicle speed is kept unchanged even if the rate of revolution or the cargo handling hydraulic pump is required to be changed to meet a requirement of cargo handling. Generally speaking, because the vehicle speed is determined by the speed of the power plant and the speed ratio, when the speed of the power plant is changed up to a rate required for the cargo handling hydraulic pump, the vehicle speed changes correspondingly irrespective of the extent of actuation of a running pedal if the speed ratio is not altered.

According to the first aspect of the present invention, the first operation means coomprises a ratio operating means (18) for computing the ratio (N, A) between the value (n/N, Al/A) in response to the power plant rate of revolution based on the operation of the cargo handling control device and value in response to the power plant speed before that operation, and the second operation means is an operating means (22) for computing the speed ratio (E) of the continuously variable transmission on the basis of the computed ratio.

Therefore, the speed ratio of the continuously variable transmission is changed in response to the ratio of speed of the power plant before and after operation of cargo handling while the vehicle is running, i.e., the control is achieved in response to the cargo handling while the vehicle is running. The operation control of the speed ratio of the continuously variable transmission ought to satisfy the following equation in the case of a constant vehicle speed:

$$e \cdot n = E \cdot N$$

where e is the speed ratio of the cargo handling operation, n is the rate of revolution of the power plant before the handling operation, E is the speed ratio after the cargo handling operation, and N is the rate of revolution of the power plant after the cargo handling operation. Accordingly, the desired control can be achieved by letting the speed ratio after the handling operation be $$E = e \cdot (n/N),$$

whereby the vehicle speed can be maintained in the same state as before the cargo handling operation.

Thus, by controlling the speed ratio of the transmission fundamentally in accordance with the foregoing equation to compensate for a variation in vehicle speed during cargo handling, there results in the advantage that the vehicle speed is maintained in the same level as that before cargo handling.

Because the speed ratio is automatically controlled, as will become clear in the embodiments described hereinafter, when the cargo handling is performed while the vehicle is running or under a like condition, advantageously, skilled operation is not required to keep constant the vehicle speed.

As apparent from the foregoing description in accordance with first aspect of the present invention, in case the cargo handling is performed while the vehicle is running the engine throttle is automatically drive-controlled, thus, troublesome operation of the engine throttle at the time of cargo handling becomes unnecessary. Because the speed ratio can be controlled so that the vehicle speed is kept unchanged if the drive pedal is held unchanged even when the engine speed would vary in response to the cargo handling, the cargo handling does not have an influence to the vehicle speed. Because the vehicle drive is controlled by operation of the drive pedal whereas the cargo handling can be controlled through the cargo handling control device, an operator is released from very annoying need to attend to control operations, such as inching manipulation. Further, because the engine is caused to increase its rate of revolution only when required, the problem of noise and fuel consumption can be ameliorated.

Further, according to the second aspect of the present invention, the first operation means comprises a difference operating means (24) for computing the difference of a vehicle speed based on the manipulation of a given cargo handling manipulation device, and the second operation means is an operating means (35, 28) for computing the speed ratio of the continuously variable transmission on the basis of the computed difference, on the basis of the cargo handling operation or its change the difference of the vehicle speed is computed, and the speed ratio of the continuously variable transmission is changed in response to the computed variation value in vehicle speed, thereby to compensate for the change in vehicle speed based on the cargo handling operation during the vehicle running. That is, because the vehicle speed can be changed by adjusting the speed ratio of the transmission, so, on the contrary, the second aspect of the present invention maintains the vehicle speed constant by altering the speed ratio on the basis of the change in vehicle speed, i.e., keeps the vehicle speed at a level in response to the value or degree of the actuation of the drive control device. Thus, if it is possible to obtain the variation value between at least the vehicle speed before the cargo handling operation (or the vehicle speed based on the operation value of the drive control manipulation device) and the vehicle speed after the cargo handling commences, a control value for the continuously variable transmission will become clear. Accordingly, the present invention controls the speed ratio of the continuously variable transmission by that control value.

As a apparent from the foregoing description, in accordance with the second aspect of the present invention, when the cargo handling operation is performed while the vehicle is running, the engine throttle is automatically drive-controlled, thus, troublesome engine operation control operations at the commencement time of cargo handling become unnecessary. In addition, even if the vehicle speed is changed in response to the cargo handling operation, the speed ratio is controlled so that the vehicle speed is restored to the original state provided that the drive pedal actuation is kept unchanged, thus, the influence of the cargo handling on the vehicle speed can be reduced remarkably.

Furthermore, according to the third aspect of the present invention, the first operation means comprises a ratio operating means (18) for computing the ratio between the value in response to the power plant rate of revolution based on the operation of the cargo handling device and the value in response to the power plant speed before that operation, and a difference operating means (24) for computing the difference of a vehicle speed based on the manipulation of given cargo handling device, the second operation means is an operating means (22, 35, 28) for computing the speed ratio of the continuously variable transmission on the basis of both the ratio of values in response to the power plant speed and the difference of the vehicle speed, the ratio of the speed of the power plant and the variation value of the vehicle speed based on the cargo handling operation or its change are computed, and the speed ratio of the continuously variable transmission is changed in response to the computed values, thereby to compensate for the change in vehicle speed based on the cargo handling operation while the vehicle is running. Because the vehicle speed can be changed by adjusting the speed ratio of the continuously variable transmission, so, on the contrary, it is possible to maintain the vehicle speed constant by changing the speed ratio on the basis of the variation in vehicle speed, i.e., it is possible to restore the variation in vehicle speed based on the operating value of the drive control device to the initial level.

To achieve the processing control of the speed ratio of the continuously variable transmission, the following equation must be satisfied in the case of the constant vehicle speed:

$$e \cdot n = E \cdot N$$

where e is the speed ratio before the cargo handling operation, n is the rate of revolution of the power plant before the cargo handling, E is the speed ratio after the cargo handling commences, N is the rate of revolution during the handling operation. Then, the desired control becomes possible if the speed ratio after cargo handling commences is set to $$E = e \cdot (n/N).$$

Accordingly, by satisfying the above the vehicle speed can be kept in the same state as before the cargo handling.

Accordingly, by controlling the speed ratio of the transmission in accordance with the foregoing two relations, it is possible to compensate for the variation in vehicle speed appearing after the cargo handling begins, thereby to maintain the vehicle speed at the same level.

As apparent from the description hereinabove, in accordance with the third aspect of the present invention, when the cargo handling is performed while the vehicle is running, the engine throttle is automatically drive-controlled, whereby troublesome engine control operation becomes unnecessary at the commencement time of cargo handling. Further, because the speed ratio is controlled so as not to cause a change in vehicle speed if the drive pedal is kept at one position even if the engine revolution rate changes in response to cargo handling, the cargo handling does not influence the vehicle speed.

Other objects of the present invention will become clear through understanding of the embodiments hereinafter described and will be stated clearly in the accompanying claims. Further, many advantages of the present invention not mentioned specifically in this specification will occur to those skilled in the art by putting the present invention into practice.

DETAILED DESCRIPTION OF THE PREFERRED EMBODIMENTS

First, the first embodiment will be described with reference to the drawings.

Figure 1:
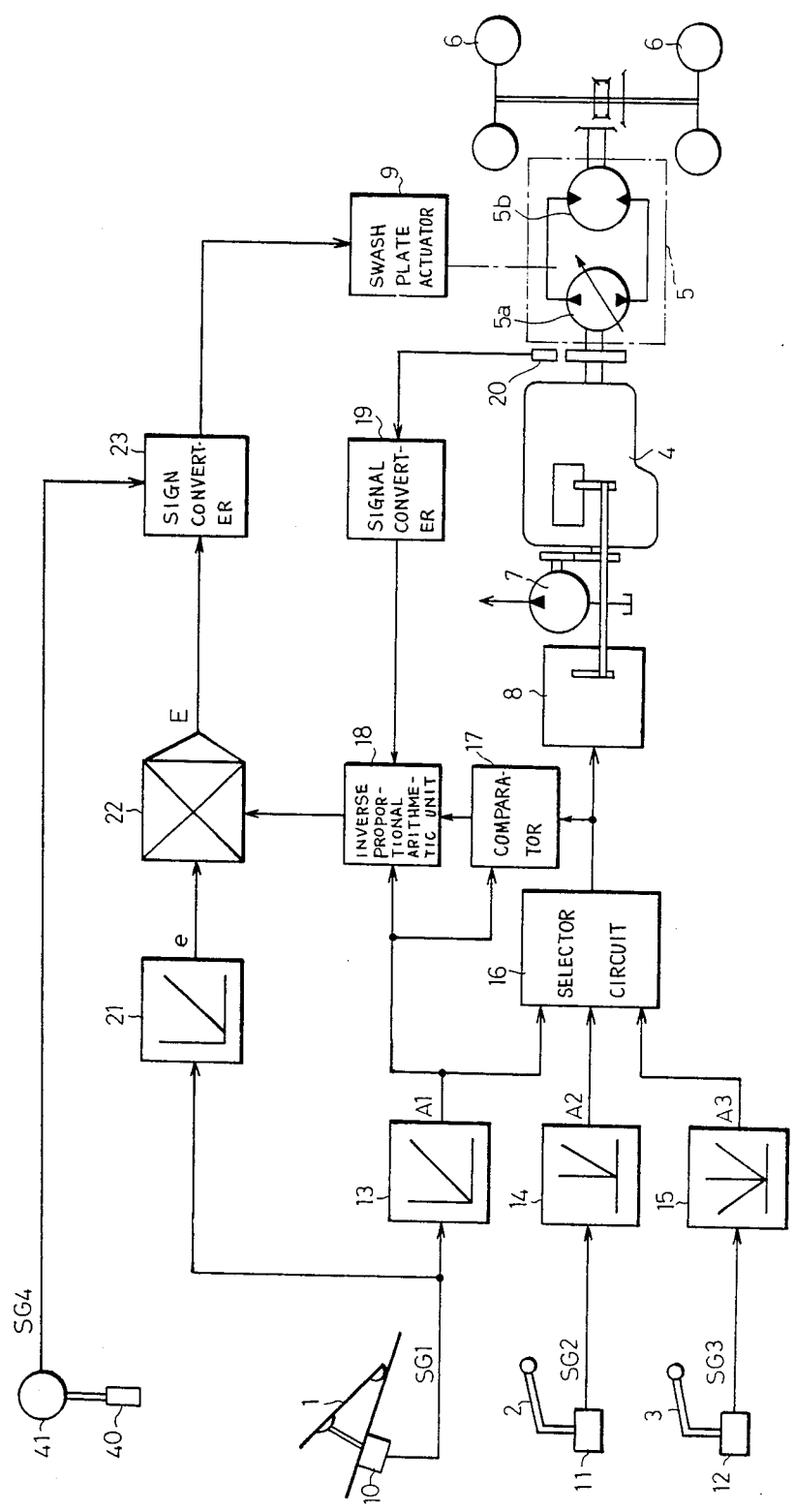
FIG. 1 is an electric block circuit diagram for explanation of a first embodiment of the present invention.

The first embodiment is the one realized in the form of a fork lift truck. FIG. 1 is the electric block circuit diagram of a control device, which controls rotation of an engine 4 on the fork lift truck, as well as the speed ratio of a continuously variable transmission 5, on the basis of operation of a running pedal 1, a lift lever 2, and a tilt lever 3. The engine 4 drives running-driving wheels 6 via the continuously varible transmission 5, and drives a cargo handling hydraulic pump 7 to supply pressure oil to a lift cylinder for moving up/down a cargo handling device or fork and a tilt cylinder for tilting a mast in the front-rear direction. A throttle to adjust the speed of the engine 4 is controlled by a throttle actuator 8 so that the degree of its opening is adjusted.

The continuously variable transmission 5 is composed of a variable volume hydraulic pump 5a and a hydraulic motor 5b. This variable volume hydraulic pump 5a is driven by the engine 4, and the hydraulic motor 5b is rotated by working oil supplied through actuation of the variable volume hydraulic pump 5a to transmit its turning force to the driving wheels 6. This embodiment employs the swash plate type hydraulic pump as the variable volume hydraulic pump 5a, so that by changing the inclination angle of a swash plate the speed ratio is altered. In turn, the inclination angle of the swash plate to adjust the speed ratio is controlled appropriately by a swash plate actuator 9.

In connection with the running pedal 1 there is provided a step-on-angle detector 10 to detect a step-on-angle, which detector may be a potentiometer, inductance type displacement-meter, varible capacitance type displacement-meter, etc. and provides a driving acceleration signal SG1 whose value is in proportion to the step-on-angle, i.e., the step-on-degree, or speed.

The lift lever 2 is operated to drive the lift cylinder, in connection with which a lift lever detector 11 is provided which is made up of a potentiometer to detect the extent of movement of that lever and provides a lift speed signal SG2 or a cargo handling signal proportional to a detected degree.

The tilt lever 3 is operated when to drive a tilt cylinder, in connection with which a tilt lever manipulation degree detector 12 is provided which is made up of a potentiometer to detect the degree of manipulation of that lever and outputs a tilt manipulation degree signal SG3 or a cargo handling signal proportional to a detected degree.

A vehicle drive function generator 13 receiving the signal SG1 is a circuit for converting the received signal SG1 to engine revolution data A1 for running, the signal SG1 being converted to the revolution data A1 on the basis of a function reflecting a pre-set running condition. This function in this embodiment is that by which the degree of throttle opening of the engine 4 is increased linearly in response to an increase acceleration by downward movement of the pedal 1, as indicated in FIG. 1. Thus, the revolution data A1 in response to the signal SG1 is provided in accordance with that function.

A lift function generator 14 receiving the lift movement signal SG2 is a circuit for converting the received signal SG2 to engine revolution data A2 for lift cylinder driving, the signal SG2 being converted to the revolution data A2 on the basis of a function reflecting a pre-set cargo handling condition. This function in that by which the degree of throttle opening of the engine 4 is increased linearly in response to an increase in the extent of movement of the lift lever 2 in the direction in which the fork is moved up, as indicated in FIG. 1. Thus, the revolution data A2 in response to the lift signal SG2 is provided in accordance with that function.

A tilt function generator 15 receiving the tilt movement signal SG3 is a circuit for converting the received signal SG3 to engine revolution data A3 for tilt cylinder driving, the signal SG3 being converted to the revolution data A3 on the basis of a function reflecting a preset cargo handling condition. This function in this embodiment is that by which the degree of throttle opening of the engine 4 is increased linearly in response to an increase in the extent of movement of the tilt lever 3 when the mast is to be tilted frontward or rearward, as indicated in FIG. 1. Thus, the revolution data A3 in response to the tilt manipulation degree signal SG3 is provided in accordance with that function.

In selecting the optimum function for each of the foregoing function generators 13 through 15, the respective optimum functions may be selected so as to meet several conditions, in response to a sensor for detecting the presence/absence of cargo and its weight, a sensor for detecting the vehicle speed, a pressure sensor included in a pressure oil network for detecting a load during the running, and the like, by judging the running condition and cargo handling condition at a given time.

The respective revolution data A1 through A3 are applied to a selector circuit 16 of the succeeding stage. This selector circuit 16 is designed so that it discriminates and selects the largest-value data out of these revolution data A1 through A3, and supplies it to the throttle actuator 8. As the largest revolution data selected in the selector circuit 16 is applied to the throttle actuator 8, this actuator 8 adjusts the throttle on the basis of that selected data to control the speed of the engine 4 so as to follow that data.

The revolution data A1 received from the vehicle drive function generator 13 and the largest revolution data selected by and received from the selector circuit 16 are applied to a comparator 17. This comparator 17 compares both data, judges whether they have the same value or not, thereby to detect if the engine 4 is being drive-controlled by the revolution data A1 based on the position of the running pedal 1, or if the cargo handling is being performed by the use of the lift lever 2 and/or the tilt lever 3. Then, the comparator 17 supplies a signal representing the presence/absence of cargo handling to an inverse proportional arithmetic unit 18 functioning as a means for computing a speed ratio.

This inverse proportional arithmetic unit 18 receives the revolution data A1 and, via a signal converter 19, a detection signal from a revolution detector 20 for detecting the speed N of the engine 4. Then, when it is judged on the basis of the detection signal from the comparator 17 that cargo handling is being performed, the inverse proportional arithmetic unit 18 computes the speed N of the engine 4 at that moment (hereinafter referred to as the cargo handling speed, for descriptive convenience) on the basis of the detection signal from the revolution detector 20, and, on the basis of the revolution data A1, the speed n (hereinafter referred to as the base vehicle speed, for descriptive convenience) which would have been obtained if the engine 4 were controlled by the revolution data A1 given in response to the extent of depression of the running pedal 1 at that moment on the assumption that no cargo handling were being performed at that moment. Then, the inverse proportional arithmetic unit 18 computes the ratio ($=n/N$) on the basis of both speeds n, N and supplies the result to a multiplier 22 hereinafter described.

If the inverse proportional arithmetic unit 18 has judged on the basis of the detection signal from the comparator 17 that no cargo handling is taking place, it always sets the ratio to "1" and supplies this result to the multiplier 22.

The driving acceleration signal SG1 is applied to a swash plate function generator 21. This swash plate function generator 21 is a circuit for converting the received signal SG1 to speed ratio data e for control of the inclination angle of the swash plate (the speed ratio) of the variable volume hydraulic pump 5a. Thus the signal SG1 is converted to the speed ratio data e in accordance with a function reflecting a pre-set running condition.

This function reflecting a running condition is set to a function which has a dead zone extending from zero to some manipulation degree and by which, within the remaining zone larger than that dead zone, the degree of throttle opening of the engine 4 is increased linearly in response to an increase in manipulation degree. Thus, the speed ratio data e in response to the running manipulation degree signal SG1 and converted in accordance with that function is applied to the multiplier 22.

The multiplier 22 multiplies the speed ratio data e by the ratio (n/N) given from the inverse proportional arithmetic unit 18, and supplies the resultant product ($E=e \cdot (n/N)$) to a sign converter 23 of the succeeding stage as a compensatory speed ratio data E.

On the basis of a forward-backward signal SG4 from a detector 41 which detects the manipulation position of forward/backward lever 40 and discriminates at what position that lever 40 is standing, forward, backward or neutral, the sign converter 23 passes the compensatory speed ratio data E to the swash plate actuator 9. Specifically, in the case of the forward position no modification is effected on that data, in the case of the backward position the compensatory speed ratio data E is changed to a negative value and then supplied to the actuator 9, and in the case of the neutral position the sign converter 23 invalidates the compensatory speed ratio data E and supplies "0" data to the swash plate actuator 9.

In turn, the swash plate actuator 9 adjusts the inclination of the swash plate on the basis of the received data E to control the speed ratio, Now, the operation and effect of the first embodiment of the foregoing structure will be described.

In case the vehicle is running with only the running pedal 1 being manipulated, the driving acceleration signal SG1 is supplied from the step-on-angle detector 10 to the vehicle drive function generator 13. The vehicle drive function generator 13 converts, in accordance with the foregoing function, the driving acceleration signal SG1 to the revolution data A1 for running and supplies to the selector circuit 16. Because only the revolution data A1 is supplied in this case, the selector circuit 16 treats this data A1 as the largest one and supplies the throttle actuator 8, thereby causing the actuator 8 to control the revolution of the engine 4.

The signal SG1 is also supplied to the swash plate function generator 21. In accordance with the foregoing function the swash plate function generator 21 converts the step-on-degree of the running pedal 1 to the speed ratio data e and feeds it to the multiplier 22.

On the other hand, because the comparator 17 is deciding that the data from the selector circuit 16 is identical with the data A1 from the vehicle drive function generator 13, the inverse proportional arithmetic unit 18 applies the ratio of value "1" to the multiplier 22. Accordingly, the multiplier 22 supplies the speed ratio data e, without modification, treating it as the compensatory speed ratio data E ($=e$), to the swash plate actuator 9 via the sign converter 23.

In the above, the speed ratio data E is supplied without modification in the case of forward running, or supplied after conversion into a negative value in the case of backward running. Then, on the basis of this speed ratio data E the swash plate actuator 9 adjusts the inclination angle of the swash plate to control the speed ratio of the continuously variable transmission 5. Accordingly, in this case, the speed ratio is controlled on the basis of the step-on-degree of the running pedal 1. Incidentally, when the forward/backward lever 40 is at neutral, the compensatory speed ratio data E of value "0" is applied to the actuator 9, thus, the inclination angle of the swash plate becomes zero.

In case the lift lever 2 is manipulated while the vehicle is running, the revolution data A1 for running is applied to the selector circuit 16, similarly to the above case. Further, the lift-speed signal SG2 is supplied from the lift lever manipulation degree detector 11 to the lift function generator 14. On the basis of the foregoing function, the lift function generator 14 converts the lift-speed degree signal SG2 to the revolution data A2 for lift cylinder driving and feeds it to the selector circuit 16.

The selector circuit 16 compares both revolution data A1 and A2 in value, selects the larger one, and, treating the selected data as the largest revolution data, feeds it to the throttle actuator 8, thereby causing the actuator 8 to control the revolution of the engine 4.

In the above, because the revolution is required in the case of cargo handling, or the torque is required in the case of running, the system is designed so that the revolution data A2 given from the lift function generator 14 has a larger value than that of the revolution data A1 of the running function generator 13. Therefore, the data output from the selector circuit 16 becomes the revolution data A2. As a result, in this case, the revolution N of the engine 4 is controlled on the basis of the revolution data A2. That is, the rate of revolution N of the engine 4 is caused to increase on the basis of the manipulation degree of the lift lever 2, not the step-on-degree of the running pedal 1. Accordingly, if the speed ratio were not altered, the vehicle speed would go up correspondingly.

On the other hand, because the two data applied to the comparator 17 differ from each other, on the basis of the revolution data A1 for running the inverse proportional arithmetic unit 18 computes the rate of revolution n of the engine 4 in response to the step-on-degree of the running pedal 1, as well as the rate of revolution N at that moment of the engine 4 on the basis of the detection signal from the revolution detector 20. Then, the inverse proportional arithmetic unit 18 computes the ratio ($=n/N$) of both revolution rates n, N and feeds it to the multiplier 22.

The multiplier 22 multiplies the speed ratio data e based on the step-on-degree of the running pedal 1 by the foregoing ratio ($=n/N$) into the compensatory speed ratio data E ($=e \cdot (n/N)$), and feeds it to the swash plate actuator 9 via the sign converter 23.

On the basis of this speed ratio data E the swash plate actuator 9 adjusts the inclination angle of the swash plate and changes the speed ratio of the continuously variable transmission 5 so that the vehicle speed may be maintained at the speed before commencement of cargo handling, i.e., the speed in response to the step-on-degree of the running pedal 1. Accordingly, in case the cargo handling manipulation is performed while the vehicle is running, a variation in vehicle speed reflecting the cargo handling operation can be compensated for without need of any high operator skill.

Similarly, even in case the lift lever 2 and/or tilt lever 3 is manipulated while the vehicle is stationary, and even in case the tilt lever 3 is manipulated while the vehicle is running, the optimum revolution data A1 through A3 are provided from the corresponding function generators 13 through 15, the speed of the engine 4 is controlled under the optimum conditions, the speed ratio of the continuously variable transmission 5 is controlled on the basis of the ratio ($=n/N$) given from the inverse proportional arithmetic unit 18, and the vehicle speed is maintained at the speed before the cargo handling began.

Accordingly, great operator skill for keeping the vehicle speed constant becomes unnecessary, contrarily to the prior art.

In modification, though in this embodiment the functions for the revolution data A1 through A3 in response to the signals SG1 through SG3 and for the speed ratio data e are pre-set in the respective function generators 13 through 15 and 21, the present invention may be realized with an increased or reduced number of functions as compared with the first embodiment. Of course, it is possible to set another function for another object different from the described embodiment and to realize the system on the basis thereof.

Though the selector circuit 16 of the embodiment described is designed to select the largest revolution data in case the revolution data A1 through A3 are supplied concurrently, it is possible to get the sum of these revolution data to treat the resultant sum as the revolution data.

Though the comparator 17 is employed to compute the speed ratio and to use it for control only when the cargo handling manipulation is performed while the vehicle is running, this comparator can be omitted if an engine, such as the all speed governor type engine, is employed whose revolution is substantially proportional to a throttle signal.

The continuously variable transmission 5 may be replaced by any type whose speed ratio can be varied arbitrarily, for example, the V-belt type continuously variable transmission may be employed.

Though the embodiment employs the running pedal 1, lift lever 2 and tilt lever 3 whose manipulation degrees are used after being converted to electric signals to control the revolution of the engine 4, these members may be coupled mechanically to the throttle of the engine 4 via link, wire, etc. In this case, a pedal angle sensor and a throttle angle sensor must be provided.

The sign converter 23 need not be included behind the multiplier 22, it may be included in front of the swash plate function generator 21, or interposed between that function generator 21 and the multiplier 22, for example.

Figure 2:
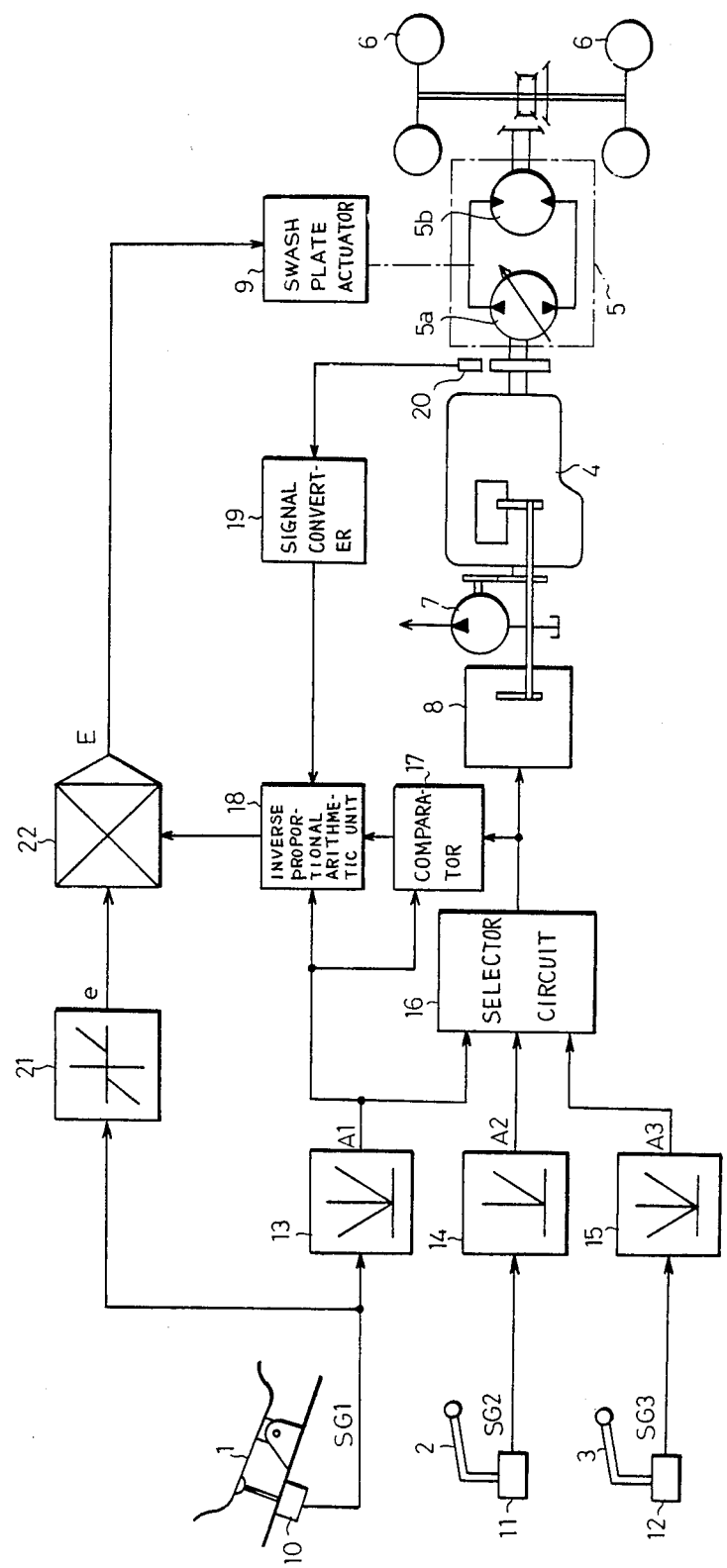
FIG. 2 is an electric block circuit diagram for explanation of a modification of the first embodiment.

If the running pedal 1 of the embodiment described is replaced by the seesaw type running pedal 1 as shown in FIG. 2, which assumes a forward running position by stepping on its front and a backward running position by stepping on its rear, the sign converter 23 becomes unnecessary and the electric circuit is simplified. In this case, when the rear portion is stepped on, the swash plate function generator 21 will provide a negative speed ratio data e.

The engine 4 may be replaced by diesel engine, gasoline engine, motor, etc, in realizing the present invention, provided that such a power plant can achieve both running and driving of the cargo handling hydraulic pump by only one machine.

Though the described embodiment employs the structure in that the throttle actuator 8 is separated from the engine 4, the throttle actuator 8 may be integral with the engine as an electronic controlled fuel injection device is, for instance.

Further, the present invention may be applied to several types of cargo handling vehicles, such as a shovel loader or height working vehicle, other than the fork lift truck.

Figure 3:
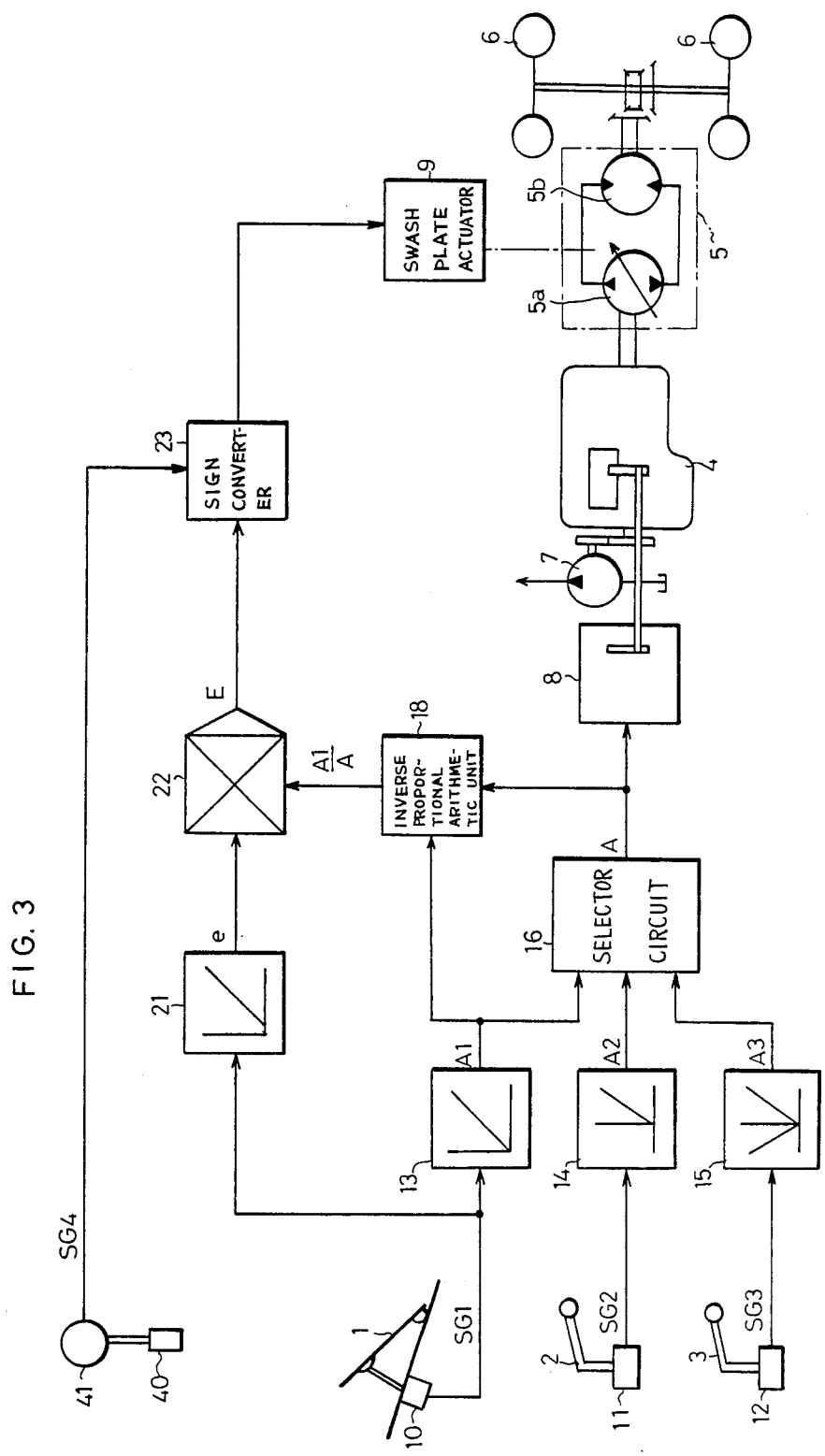
FIG. 3 is an electric block circuit diagram for explanation of a second embodiment of the present invention.

The second embodiment is similar to the first embodiment, in that the present invention is embodied in a fork lift truck as shown in FIG. 3, but differs from the first embodiment in that the engine 4 serving as the power plant of the first embodiment is replaced by a power plant of the type, such as an all speed governor type diesel engine, or DC motor, whose revolution can be set arbitrarily.

When an all speed governor type diesel engine is used, within a certain extent of the throttle opening the variation in speed is small if the load does not exceed the maximum load while the load is varying. The engine speed is substantially proportional to the degree of throttle opening. Thus, the engine revolution rate N can be computed through conversion of the foregoing revolution data A1 through A3.

That is, it can be assumed that the compensatory speed ratio data E ($=e \cdot (n/N)$) be $E=e \cdot$(the revolution data A1 for running)/(the revolution data given from the selector circuit 16).

Now, the second embodiment utilizing the features of the all speed governor type diesel engine will be described with reference to FIG. 3.

In this second embodiment, the comparator 17, signal converter 19 and revolution detector 20 included in the first embodiment are not needed. The inverse proportional arithmetic unit 18 is always receiving the revolution data A1 for running and the revolution data of the largest (hereinafter referred to as the maximum revolution data A) given from the selector circuit 16, computes the ratio ($=A1/A$) on the basis of the both received data, and feeds it the multiplier 22. The multiplier 22 computes, similarly to the first embodiment, the compensatory speed ratio data E ($=e \cdot (A1/A)$) and causes the swash plate actuator 9 to control the speed ratio of the continuously variable transmission 5, thereby compensating for a variation in vehicle speed.

Accordingly, the second embodiment can produce effects similar to those of the first embodiment. In addition, because the comparator 17, signal converter 19 and revolution detector 20 are not required, the electronic circuit is simplified, whereby this embodiment is very advantageous from the viewpoint of costs and designing.

Figure 4:
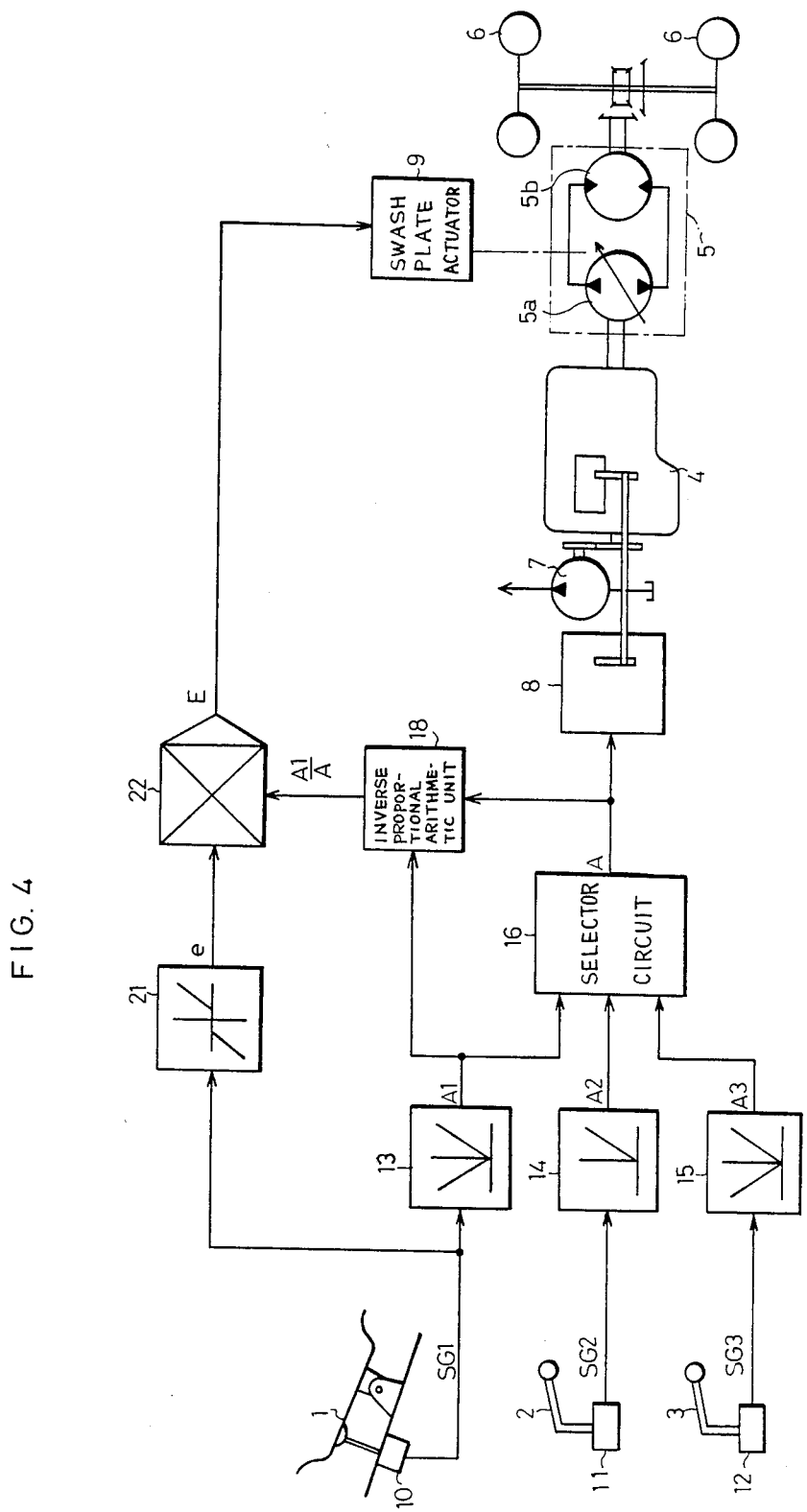
FIG. 4 is an electric block circuit diagram for explanation of a modification of the second embodiment.

Further, if the running pedal 1 of this embodiment is replaced by the seesaw type running pedal 1 as shown in FIG. 4 which assumes a forward running position by stepping on its front and a backward running position by stepping on its rear, the sign converter 23 becomes unnecessary and the electronic circuit is simplified.

The third embodiment is the one employing a microcomputer.

Figure 5:
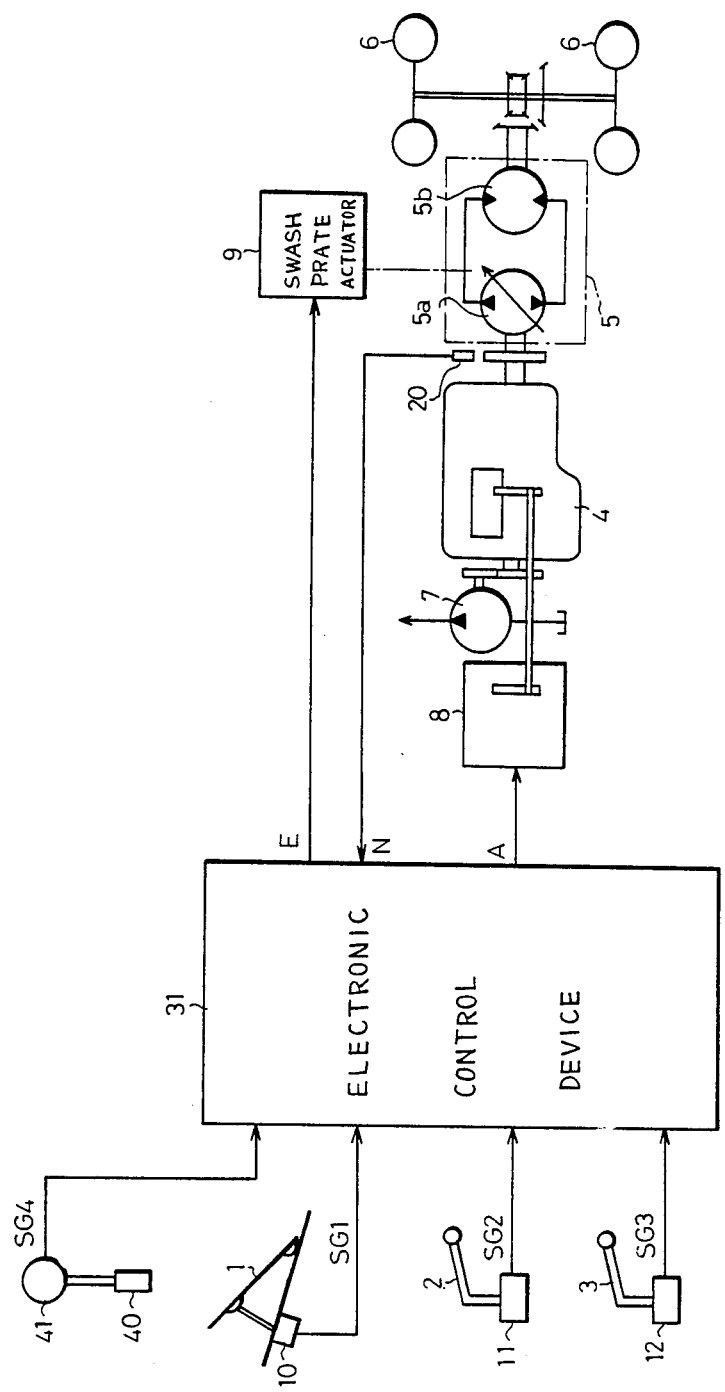
FIG. 5 is an electric block circuit diagram for explanation of a third embodiment of the present invention.
Figure 6:
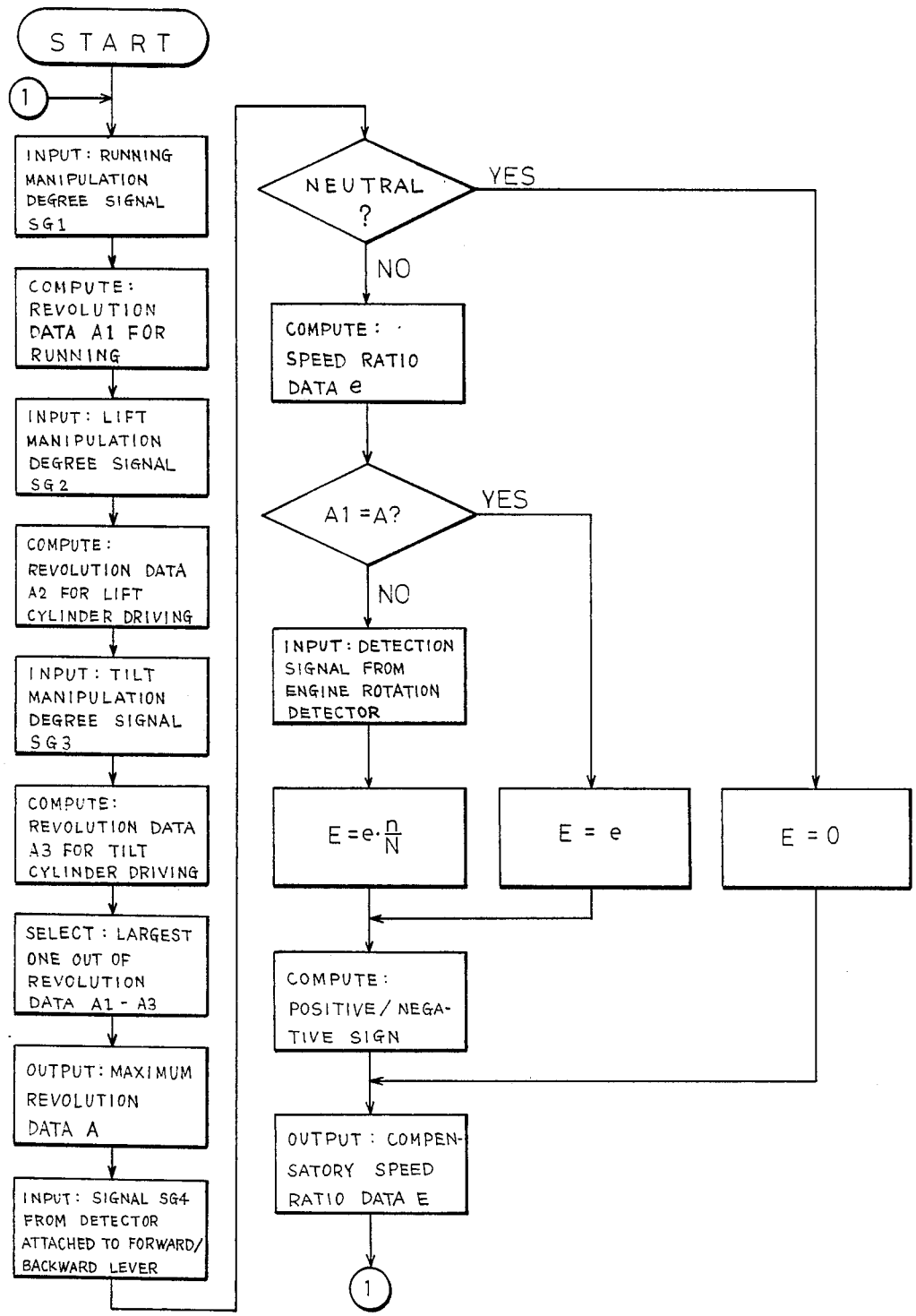
FIG. 6 is a flowchart showing the processing operation of an electronic device of the third embodiment.

As shown in FIG. 5, the manipulation degree signals SG1 through SG3, the detection signal N from the revolution detector 20, and the detection signal SG4 from the detector 41 attached to the forward/backward lever 40 are applied to an electronic control device 31 composed of a central processing unit (CPU), a read-only memory (ROM) for storing a control program, a random access or read/write-able memory (RAM) for storing various data, etc. The electronic control device performs its processing operation in accordance with the flowchart shown in FIG., 6 on the basis of the respective signals.

Provided that the revolution data A1 through A3 and the speed ratio data e are computed in accordance with certain functions selected on the basis of a pre-set program. Further, computation of the maximum revolution data A, engine revolutions n, N, ratio ($=n/N$) and compensatory speed ratio data E and control of the throttle actuator 8 and swash plate actuator 9 are effected under the control of the program.

In the foregoing respective embodiments, the compensatory speed ratio data E is computed on the basis of the revolution ratio of the engine or the ratio of the revolution data. In the case of the swash plate type variable volume hydraulic pump and swash plate type hydraulic motor, as the angle of the swash plate becomes small the efficiency thereof lowers, thus, it is not true in such a case that the swash plate angle is in proportion to the speed ratio.

In such a case as above, the difficulty can be overcome by correcting the compensatory speed ratio based on the engine revolution and the compensatory speed ratio based on the revolution data in accordance with the following:

$$E=n/(f(\theta) \cdot (N-n)+n)$$

$$E=A1/(f(\theta) \cdot (A-A1)+A1)$$

where $f(\theta)$ is a correction function for a drop in efficiency against the swash plate angle.

Further, if the operation range of the swash plate angle of the swash plate being operated at the time cargo handling is effected while the vehicle is running is limited and if the rate of lowering in efficiency can be approximated by a constant, the following equations can be employed:

$$E=n/(a \cdot (N-n)+n)$$

$$E=A1/(a \cdot (A-A1)+A1)$$

where a is a correction constant for a drop in efficiency.

As apparent from the foregoing description, in accordance with the first, second and third embodiments and their modifications, in case the cargo handling is performed while the vehicle is running the engine throttle is automatically drive-controlled, thus, troublesome manipulation of the engine throttle at the time of cargo handling becomes unnecessary. Because the speed ratio can be controlled so that the vehicle speed is kept unchanged if the running pedal is held unchanged even when the engine revolution would vary in response to the cargo handling manipulation, the cargo handling manipulation does not have any influence on the vehicle speed. Because the running is controlled by manipulation of the running pedal whereas the cargo handling can be controlled through the cargo handling manipulation device, an operator is released from very annoying control operations, such as inching manipulation. Further, because the engine is caused to increase its revolution only when required, the problem of noise and fuel consumption can be alleviated.

Now, the fourth, fifth and sixth embodiments of the present invention will be described with reference to FIGS. 7 through 12.

First, the different points of the fourth embodiment from the foregoing first embodiment will be described.

Figure 7:
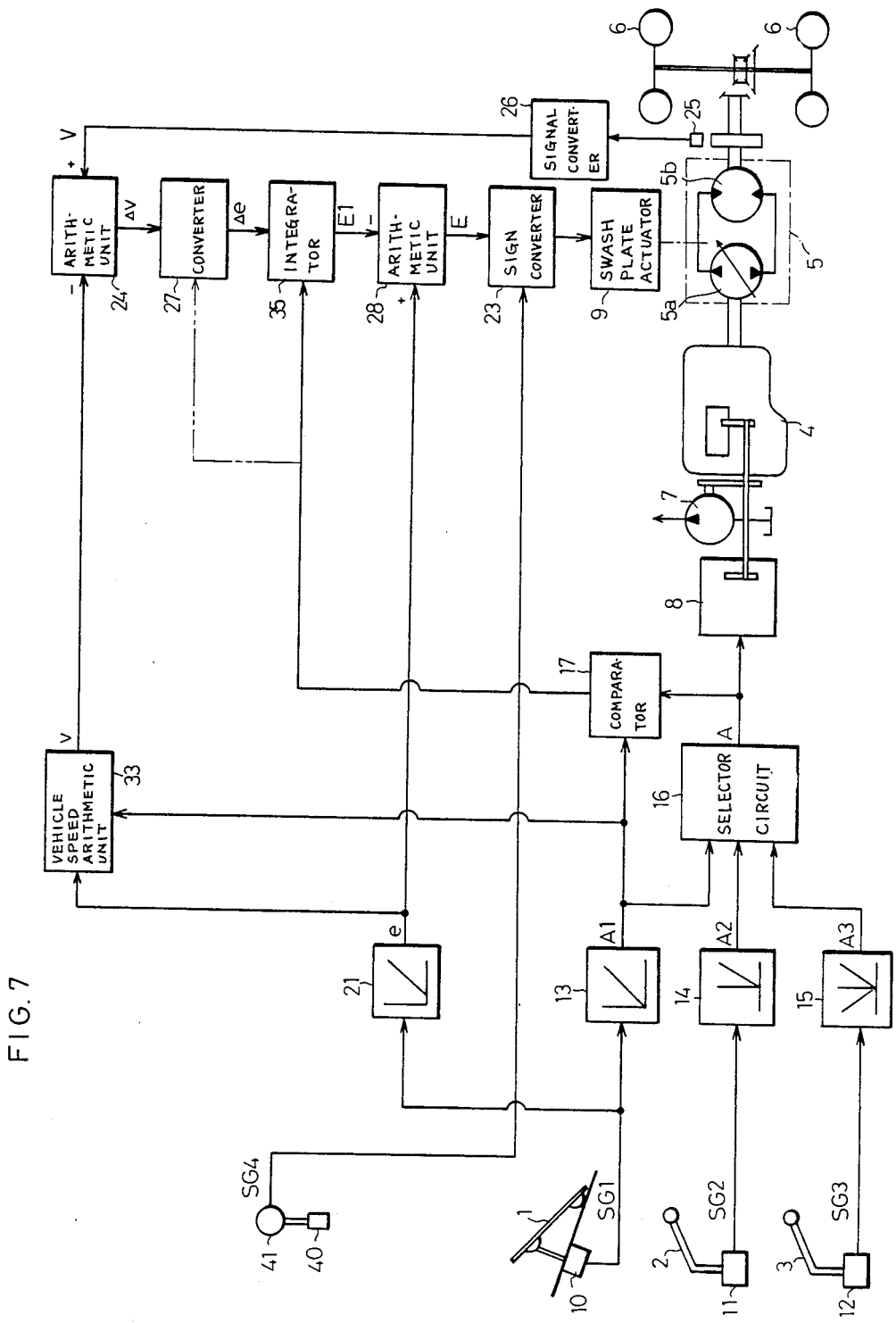
FIG. 7 is an electric block circuit diagram for explanation of a fourth embodiment of the present invention.

In this fourth embodiment, as shown in FIG. 7, the comparator 17 supplies to an integrator 35 a signal representing the presence/absence of a cargo handling operation and, if the cargo handling manipulation is being performed, a signal representing the rate of cargo handling, $\Delta A = A - A1$, $A/A1$, $\Delta A/A1$, etc. The gain of the integrator 35 is adjusted by these signals.

A vehicle speed arithmetic unit 33 is a circuit for computing a vehicle speed data v from the revolution data A1 and the speed ratio data e, that is, this unit 33 supplies the vehicle speed v, which might be obtained if the running pedal 1 is manipulated while no cargo handling manipulation is performed, to an arithmetic unit 24.

The arithmetic unit 24 receives the foregoing vehicle speed data v and, as the current vehicle speed data V, the revolution of the hydraulic motor 5b of the continuously variable transmission 5, i.e., the detection signal from a vehicle speed detector 25 for detecting the actual vehicle speed V, through a signal converter 26. In turn, this arithmetic unit 24 computes a vehicle speed variate data $\Delta v$ which is the difference $\Delta v$ ($=V-v$) between the vehicle speed v based on the manipulation of the running pedal 1 and the actual vehicle sped V, and supplies to a converter 27.

In order to restore the original vehicle speed by changing the speed ratio by a varied speed fraction of the vehicle speed V, the converter 27 converts the vehicle speed variate data $\Delta v$ to a revisory inclination angle value $\Delta e$, which will be used to amend the swash plate angle of the variable volume hydraulic pump 5a, and supplies to the integrator 35 of the succeeding stage.

When a signal indicating that the cargo handling manipulation is taking place is being given from the comparator 17, the integrator 35 integrates the revisory inclination angle value $\Delta e$ at a gain in response to a signal, representing the rate of the cargo handling mainipulation degree and given from the comparator 17, converts it to an corrective inclination angle value E1, and supplies to an arithmetic unit 28 of the succeeding stage. On the contrary, when a signal indicating that no cargo handling is taking place is being given, the integrator 35 does not perform the foregoing computation and provides data of "0".

The arithmetic unit 28 corrects the speed ratio data e for control of the inclination angle of the swash plate, based on the running pedal 1 and given from the swash plate function generator 21, by the foregoing revisory inclination angle value $\Delta e$ to produce the compensatory speed ratio data E ($=e-E1$), and feeds it to the sign converter 23.

Similarly to the foregoing first embodiment, the sign converter 23 detects the manipulation position of the forward/backward lever 40 and, on the basis of the forward/backward signal SG4, supplies the foregoing compensatory speed ratio data E to the swash plate actuator 9. Now the operation and effect of the fourth embodiment of the foregoing structure will be described.

If the vehicle is by operation of the running pedal 1 only, the driving acceleration signal SG1 is supplied from the step-on-angle detector 10 to the vehicle drive function generator 13 and to the swash plate function generator 21. The swash plate function generator 21 converts the step-on-degree of the running pedal 1 to the speed ratio data e in accordance with the foregoing function, and supplies to the arithmetic unit 28. The vehicle speed arithmetic unit 33 supplies the vehicle speed data v based on the step-on-degree of the running pedal 1 to the arithmetic unit 24.

The arithmetic unit 24 computes the difference between the vehicle speed data v, computable from the revolution data A1 and the speed ratio data e, and the current/actual vehicle speed V based on the detection signal from the vehicle speed detector 21 to obtain the vehicle speed variate data $\Delta v$ ($=V-v$), and feeds it to the converter 27. The converter 27 converts it to the revisory inclination angle value $\Delta e$ and feeds it to the integrator 35.

On the other hand, because the comparator 17 has judged that the data A from the selector circuit 16 is identical with the data A1 from the running function generator 13, the integrator 35 does not compute and supplies the value of "0" to the arithmetic unit 28 of the succeeding stage. Accordingly, the arithmetic unit 28 supplies the speed ratio data e without modification, treating it as the compensatory speed ratio data E ($=e$), via the sign converter 23 to the swash plate actuator 9.

In this case, similarly to the foregoing first embodiment, the speed ratio data E is applied to the succeeding stage without change in the case of forward running, or after being changed to a negative value in the case of backward running. Then, on the basis of this speed ratio data E the swash plate actuator 9 adjusts the inclination angle of the swash plate to control the speed ratio of the continuously variable transmission 5. Accordingly, in this case, the speed ratio is controlled on the basis of the step-on-degree of the running pedal 1. When the forward/backward lever 40 is at neutral, the compensatory speed ratio data E of "0" is applied to the actuator 9, thus, the inclination angle of the swash plate becomes zero.

Then, in case the lift lever 2 is manipulated while the vehicle is running similarly to the above, the revolution data A1 for running is applied to the selector circuit 16. On the other hand, the lift mainpulation degree signal SG2 is supplied from the lift lever manipulation degree detector 11 to the lift function generator 14. The lift function generator 14 converts the lift-speed signal SG2 to the revolution data A2 for lift cylinder driving, in accordance with the foregoing function, and feeds it to the selector circuit 16.

The selector circuit 16 compares in value both revolution data A1 and A2 and selects the larger one, and, treating it as the maximum revolution data A, feeds it to the throttle actuator 8, thereby causing the actuator 8 to control the revolution of the engine 4.

In the above, because the system is set so that the revolution data A2 has a larger value than that of the revolution data A1, similarly to the foregoing first embodiment, the data A from the selector circuit 16 is the revolution data A2. Accordingly, in this case, the revolution N of the engine 4 becomes different from the revolution N based on the step-on-degree of the running pedal 1, and increases on the basis of the manipulation degree of the lift lever 2. Then, if that speed ratio were kept unchanged irrespective of the above change, the vehicle speed V would increase.

On the other hand, the arithmetic unit 24 computes the difference between the vehicle speed v based on the step-on-degree of the running pedal 1 and the current/actual vehicle speed V based on the detection signal from the vehicle speed detector 25 to obtain the vehicle speed variate data $\Delta v$ ($=V-v$), and feeds it to the converter 27.

The converter 27 converts it to the revisory inclination angle value $\Delta e$ and feeds it to the integrator 35. On the other hand, because the two data A1 and A2 applied to the comparator 17 differ from each other, the integrator 35 converts at a gain in response to the signal, representing the rate of the cargo handling and given from the comparator 17, the value Δe to the corrective inclination angle value E1 and feeds it to the arithmetic unit 28. In this arithmetic unit 28 the compensatory speed ratio data E (=e−E1) is computed and applied to the swash plate actuator 9 via the sign converter 23.

On the basis of this speed ratio data E the swash plate actuator 9 adjusts the inclination angle of the swash plate, thereby to change the speed ratio of the continuously variable transmission 5 so that the vehicle speed V is maintained at the value in response to the speed before commencement of cargo handling, i.e., the vehicle speed v based on the step-on-degree of the running pedal 1. Accordingly, if the cargo handling manipulation is performed while the vehicle is running, a variation in vehicle speed caused by the cargo handling operation can be compensated for without need of great operator skill.

Similarly, even in case the lift lever 2 and/or tilt lever 3 is manipulated with the vehicle stopped, and even in case the tilt lever 3 is manipulated while the vehicle is running, the optimum revolution data A1 through A3 are given from the respective function generators 13 through 15 and the engine 4 is rotation-controlled under the optimum conditions. In addition, on the basis of the vehicle speed variate data Δv given from the arithmetic unit 24 the revisory inclination angle value Δe is computed, then, the compensatory speed ratio data E is obtained, by which the speed ratio of the continuously variable transmission 5 is controlled, thus, the vehicle is maintained at the speed before cargo handling.

Therefore, the present invention obviates the need for great skill to maintain the vehicle speed constant that was required in the prior art, and produces the advantage of lessening the problems of noise and fuel consumption.

In modification of the fourth embodiment, the system may be put into practice with addition of a different function generator other than the foregoing function generators 13 through 15 and 21 or with elimination of any one of these generators. Of course, the respective functions may be chosen so as to meet purposes different from the foregoing purposes and pre-set to practice the system. In case the revolution data A1 through A3 are given concurrently, the selector circuit 16 may sum up them and use the sum as the revolution data.

Gain adjustment of the signal, representing the rate of the cargo handling and given from the comparator 17, may be realized in the converter 27. Or, the comparator 17 may provide only the signal indicating whether cargo handling has been performed or not, and the gains of the converter 27 and integrator 35 may be fixed. If so designed, gain adjusting circuits of the comparator 17, converter 27 and integrator 35 may be omitted and these units can be simplified.

Though the comparator 17 controls the computation operation of the integrator 35 in the embodiment, if the integrator 35 were omitted the data Δv could be cut off or allowed to pass at the output stage of the arithmetic unit 24, or the revisory inclination angle value Δe could be cut off or allowed to pass at the output stage of the converter 27. Though the comparator 17 is employed in the embodiment to compute and control the speed ratio only when cargo handling has been performed while the vehicle is running, this unit can be omitted if Δv=0 while the vehicle is only driving. Without employment of the comparator 17, it is possible to detect the revolution data A1, A2 and/or the lift manipulation degree signals SG2, SG3 and to control the integrator 35 by these detection signals.

The continuously variable transmission 5 may be of the V-belt stepless type. The running pedal 1, lift lever 2 and tilt lever 3 may be coupled mechanically to the throttle of the engine 4 by means of link, wire, etc.

The sign converter 23 does not need to be positioned behind the arithmetic unit 28, it may be positioned in front of the swash plate function generator 21 or interposed between that function generator 21 and the arithmetic unit 28, for example. In this case, the arithmetic unit 28 must judge the positive/negative of the speed ratio data e and do computation.

Figure 8:
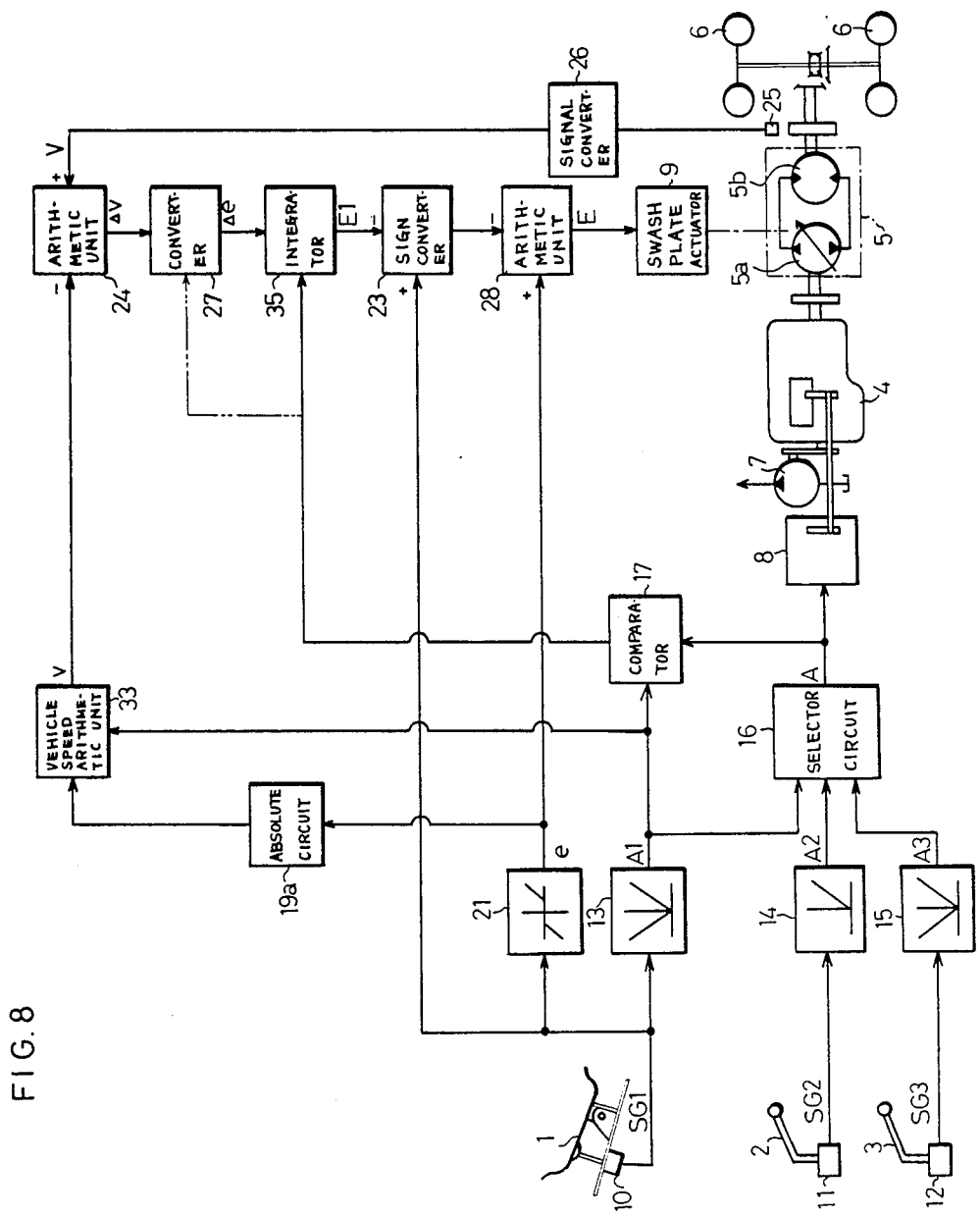
FIG. 8 is an electric block circuit diagram for explanation of a modification of the fourth embodiment.

Further, the running pedal 1 of the fourth embodiment can be replaced by the seesaw type running pedal 1, as shown in FIG. 8, which assumes a forward running position by stepping on its front and a backward running position by stepping on its rear. In this case, the swash plate function generator 21 must provide the negative speed ratio data e when the rear portion of the seesaw type pedal is stepped on, and there must be provided, in the preceding stage of the vehicle speed arithmetic unit 33, an absolute circuit 19a for converting the negative data e to positive.

In addition, this embodiment may be realized by replacing the engine 4 by diesel engine, gasoline engine, motor, etc., and the throttle actuator 8 may be integral with the engine 4.

Figure 9:
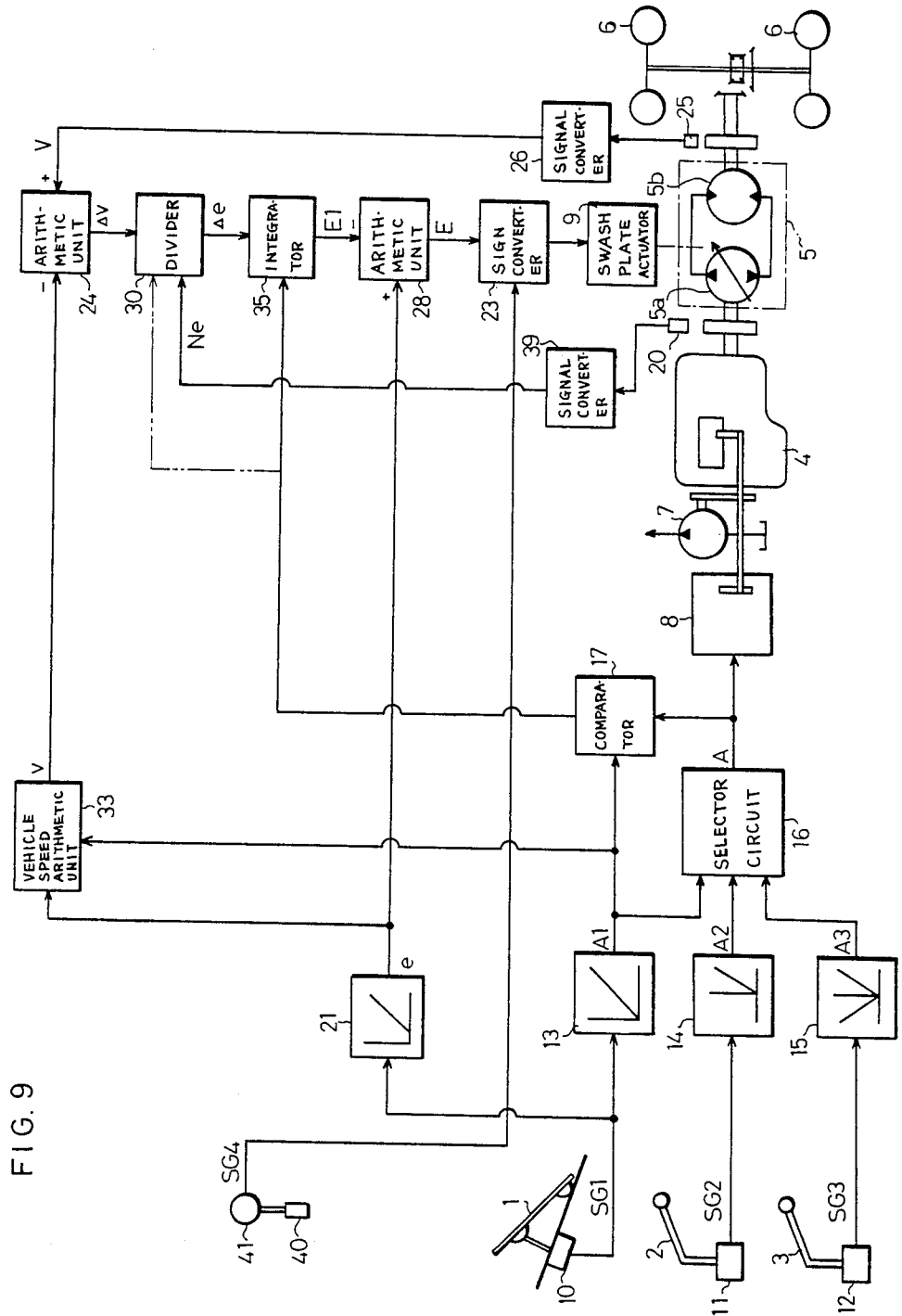
FIG. 9 is an electric block circuit diagram for explanation of a fifth embodiment of the present invention.

The fifth embodiment is the one realized in the form of a fork lift truck as shown in FIG. 9, similar to the fourth embodiment.

While in the fourth embodiment the converter 27 produces the revisory inclination angle value Δe only from the vehicle speed variate data Δv (=V−v), the fifth embodiment divides the vehicle speed variate data Δv by the current revolution N of the engine 4 and uses the result (=v/N) as the revisory inclination angle value Δe, thus differing from the fourth embodiment.

That is, as shown in FIG. 9, in place of the converter 27 this fifth embodiment uses a revolution detector 20 for detecting the revolution N of the engine 4, its signal converter 39, and a divider 30 for dividing the vehicle speed variate data Δv by the revolution N. By that arrangement the property of convergency can be enhanced, in comparison with the fourth embodiment.

Because in the case of the all speed governor type diesel engine the throttle signal is in proportion to the engine revolution N, it is possible to omit the revolution detector 20 and signal converter 39 and to use the maximum revolution data A in place of the revolution rate N. The fifth embodiment may also employ the seesaw type running pedal included in the fourth embodiment.

Figure 10:
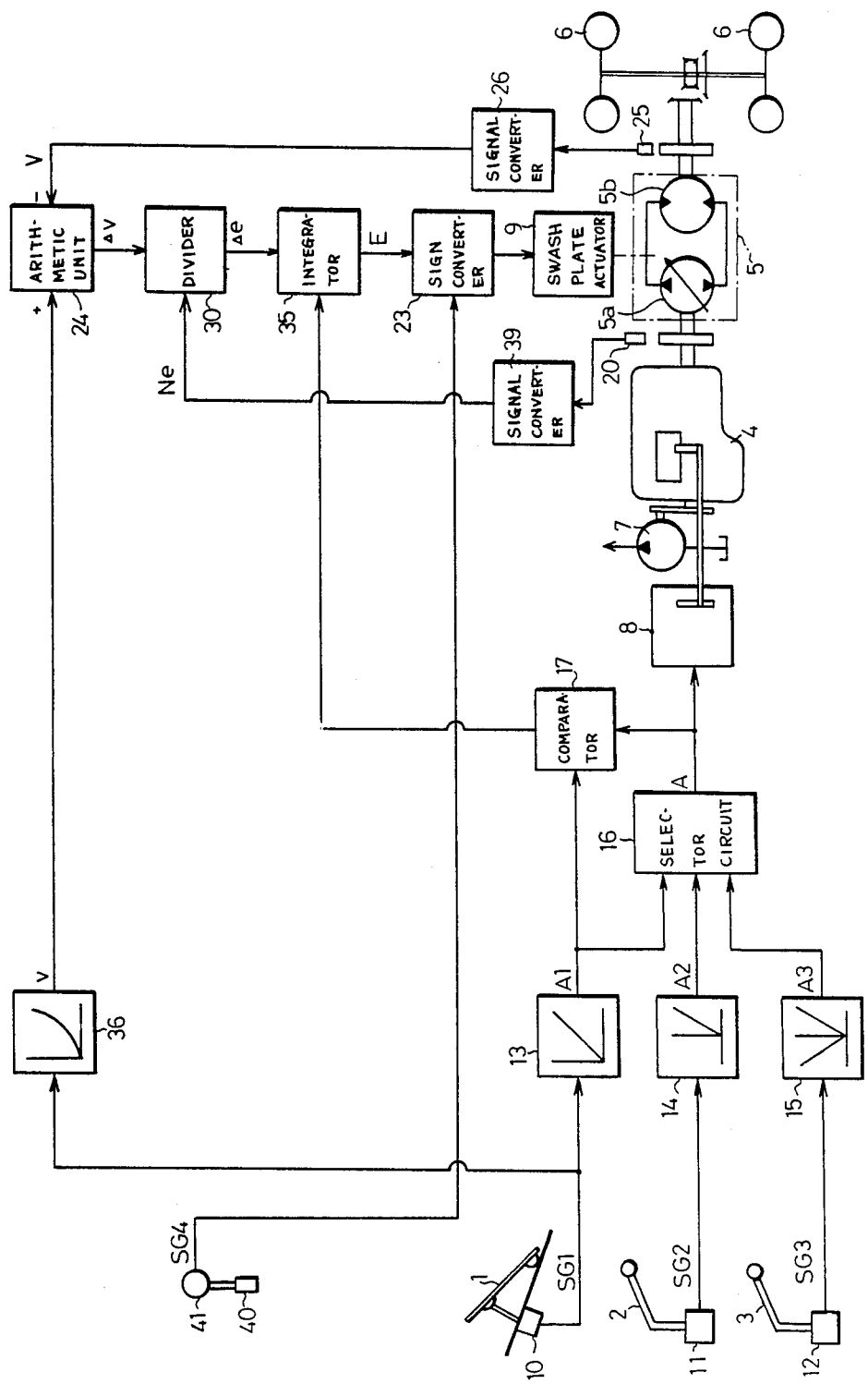
FIG. 10 is an electric block circuit diagram similar to that shown in FIG. 9.

In addition, while in the fifth embodiment shown in FIG. 9 the vehicle speed data v is computed by a vehicle speed arithmetic unit 33 from the revolution data A1 and the speed ratio data e, this vehicle speed detector 33 may be replaced by a vehicle speed function generator 36 as shown in FIG. 10, which converts the manipulation degree signal SG1 to the vehicle speed data v. That is, this vehicle speed function generator 36 is a circuit for providing the vehicle speed v which might be obtained if the running pedal 1 is manipulated.

The sixth embodiment employs a microcomputer.

Figure 11:
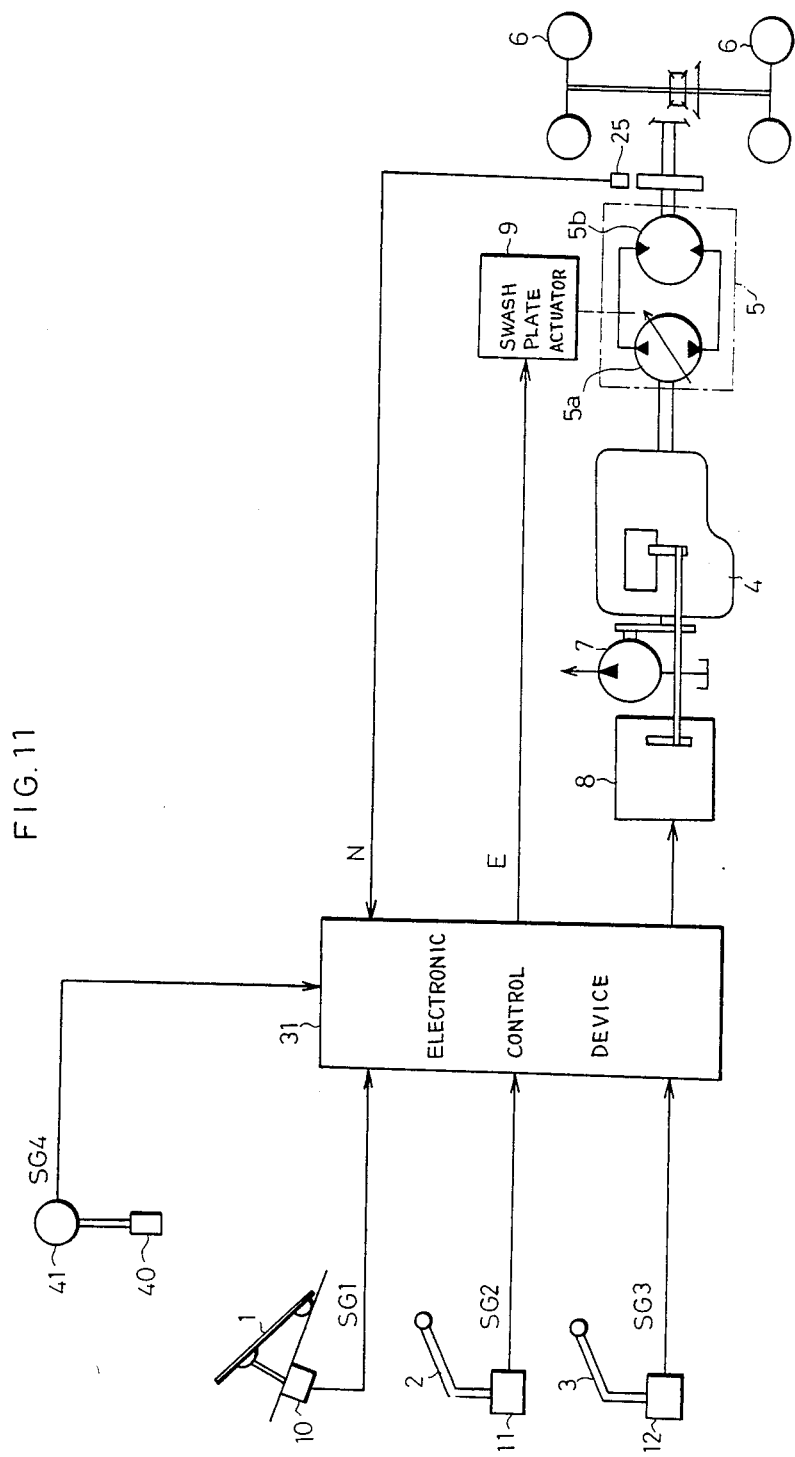
FIG. 11 is an electric block circuit diagram for explanation of a sixth embodiment of the present invention.
Figure 12:
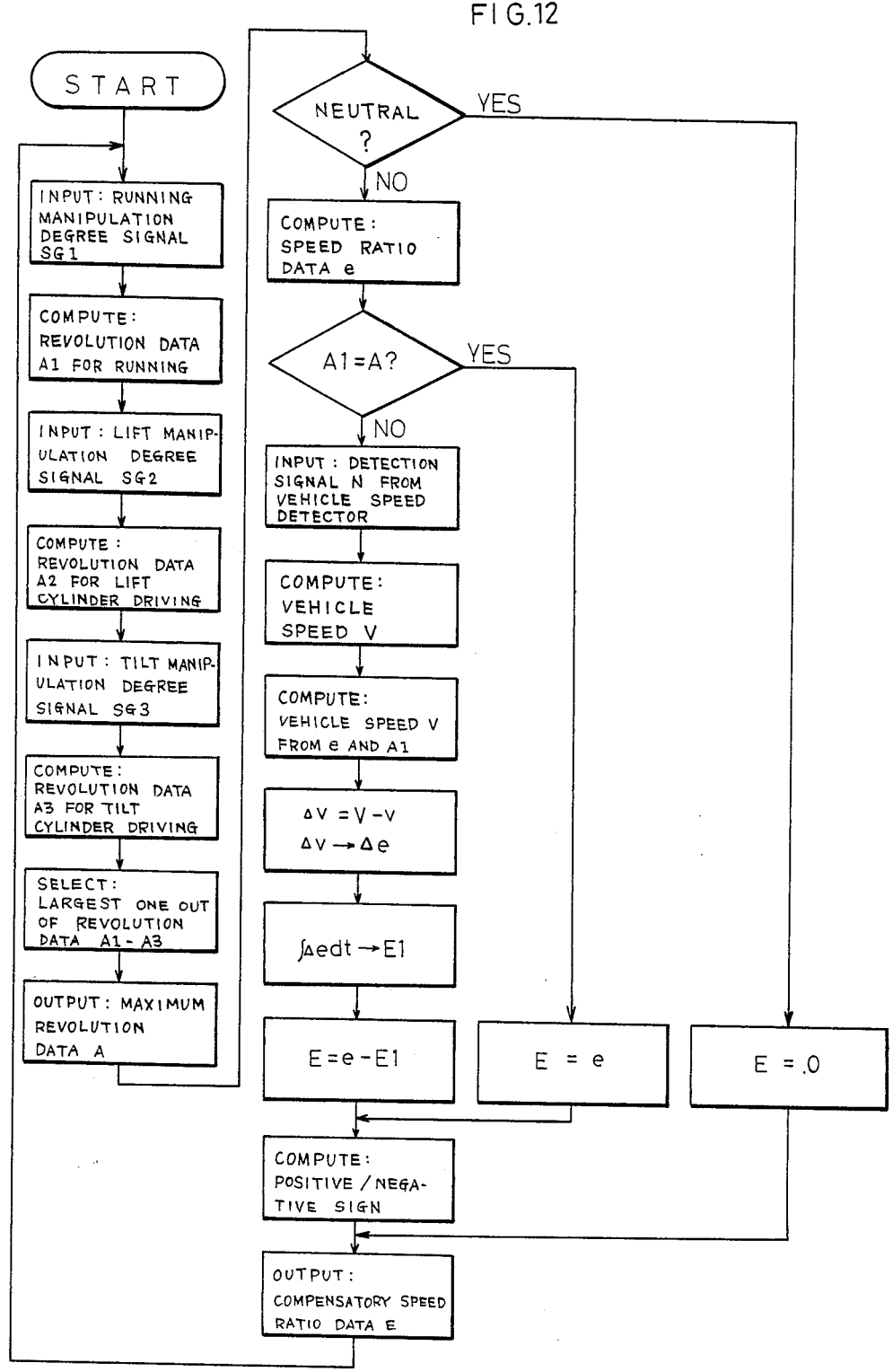
FIG. 12 is a flowchart showing the processing operation of an electronic device of the sixth embodiment.

As shown in FIG. 11, the respective manipulation degree signals SG1 through SG3, the detection signal N from the vehicle speed forward/backward 25, and the detection signal SG4 from the detector 41 attached to the forward/backward lever 40 are supplied to the electronic control device 31, similarly to the foregoing third embodiment. This electronic control device processes these signals in accordance with the flowchart shown in FIG. 12.

In the above, computation of the revolution data A1 through A3, speed ratio data e and vehicle speed data v is achieved by selecting certain functions on the basis of the pre-set program and by processing these signals in accordance with the thus selected functions. Also, computation of the maximum revolution data A, vehicle speed variate data $\Delta v$, revisory inclination angle value $\Delta e$ and compensatory speed ratio data E, as well as control of the throttle actuator 8 and swash plate actuator 9, is processed through the program.

As apparent from the foregoing description, in accordance with the fourth, fifth and sixth embodiments and their modifications, when the cargo handling is performed while the vehicle is running, the engine throttle is automatically drive-controlled, thus, troublesome engine manipulation at the time of cargo handling becomes unnecessary. In addition, even if the vehicle speed is changed in response to the cargo handling operation, the speed ratio is controlled so that the vehicle speed is restored to the original state provided that the running pedal is kept unchanged, thus, the influence of the cargo handling operation on the vehicle speed can be reduced remarkably.

Figure 13:
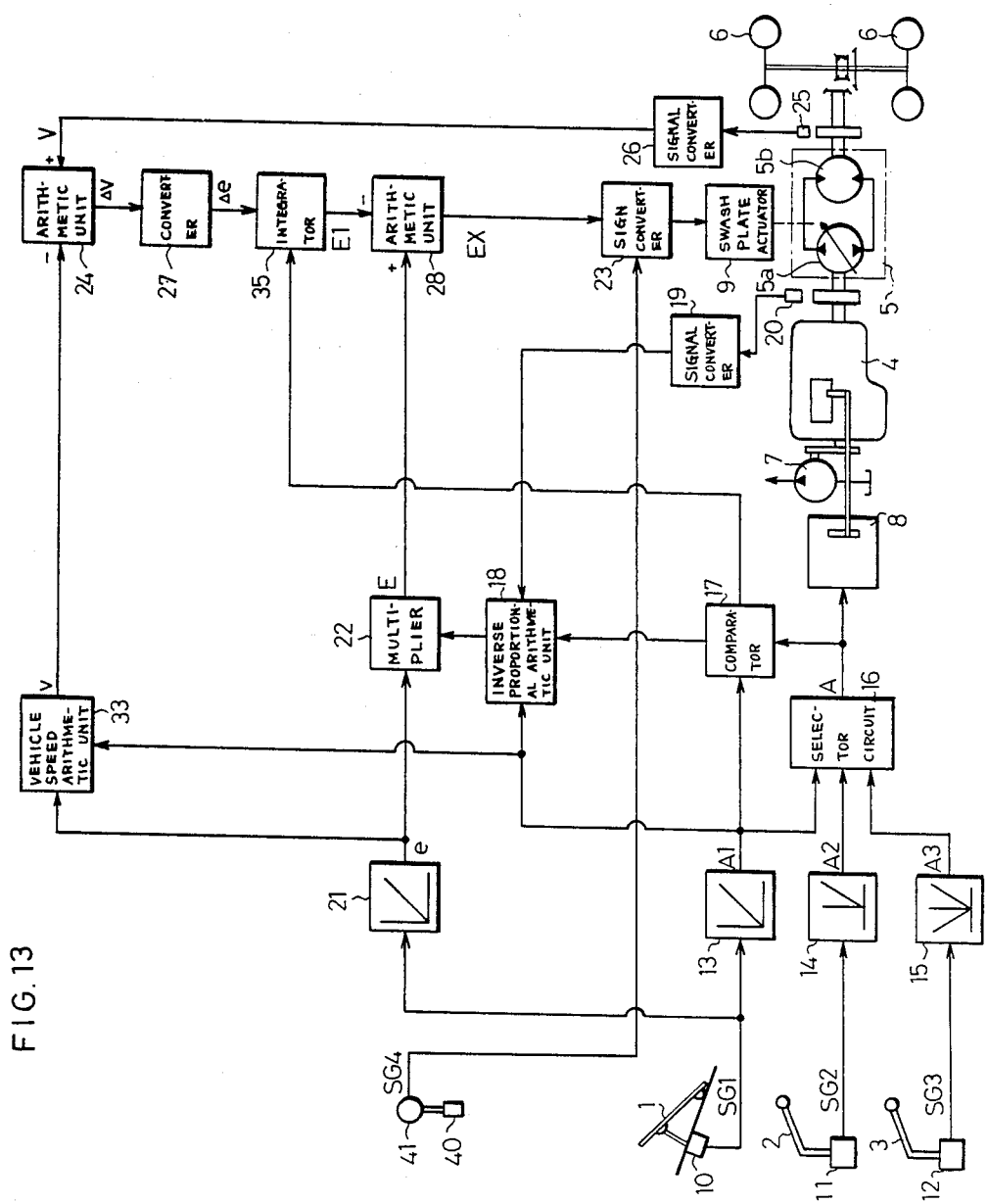
FIG. 13 is an electric block circuit diagram for explanation of a seventh embodiment of the present invention.

The seventh, eighth, and ninth embodiments of the present invention will be described with reference to FIGS. 13 through 15.

First, the different points of the seventh embodiment from the fourth embodiment will be described. In the seventh embodiment, the comparator 17 supplies the signal indicating the presence/absence of a cargo handling operation to the inverse proportional arithmetic unit 18 and the integrator 35.

The inverse proportional arithmetic unit 18 receives, similar to the foregoing first embodiment, the foregoing revolution data A1 and the detection signal from the revolution detector 20 via the signal converter 19. On the basis of the detection signal from the comparator 17 if it is judged that the cargo handling operation is being performed, the inverse proportional arithmetic unit 18 computes the revolution rate N after cargo handling begins on the basis of the detection signal from the revolution detector 20 and, on the basis of that data A1, the revolution rate n before that operation which would be expected at that moment if that cargo handling operation were not going on. Then, the inverse proportional arithmetic unit 18 computes the ratio (=n/N) on the basis of these revolution rates n, N and feeds it to the following multiplier 22.

Or, if the inverse proportional arithmetic unit 18 has judged that no cargo handling operation has taken place on the basis of the detection signal from the comparator 17, it always makes the ratio "1" and feeds it to the multiplier 22.

The driving acceleration signal SG1 is applied to the swash plate function generator 21, and the speed ratio data e relating to that signal SG1 is applied to the multiplier 22.

The multiplier 22 multiplies the speed ratio data e by the ratio (n/N) from the inverse proportional arithmetic unit 18 and supplies the resultant product $(E=e\cdot(n/N)$ as the rotation compensatory speed ratio data E.

The vehicle speed arithmetic unit 33 is a circuit for obtaining the revolution n before a cargo handling operation computed from the revolution data A1 and the vehicle speed data v computed from the speed ratio e, and supplies to the arithmetic unit 24 the vehicle speed v which might obtain if the running pedal 1 were actuated with no cargo handling operations.

The arithmetic unit 24 receives, similarly to the foregoing fourth embodiment, the vehicle speed data v and the vehicle speed data v from the vehicle speed detector 25. Then, the arithmetic unit 24 supplies the vehicle speed variate data $\Delta v$ to the converter 27.

The converter 27 converts the vehicle speed variate data $\Delta v$ to the revisory inclination angle value $\Delta e$ and feeds it to the integrator 35.

When the signal indicating that the cargo handling manipulation is being performed is being given from the comparator 17, the integrator 35 integrates the revisory inclination angle value $\Delta e$ at a gain in response to the signal, representing the rate of the cargo handling operation degree and given from the comparator 17, to convert it to the corrective inclination angle value E1, and supplies to the following arithmetic unit 28. On the contrary, when the signal indicating that no cargo handling operation has taken place is being given, the integrator 35 does not perform computation and provides the value of "0".

The arithmetic unit 28 corrects the revolution compensatory speed ratio data E given from the multiplier 22 further by the corrective inclination angle value E1 to obtain the compensatory speed ratio EX (=E−E1), and feeds it to the sign converter 23.

The sign converter 23 detects the position of the forward/backward lever 40, and supplies to the swash plate actuator 9 the compensatory speed ratio data EX without modification in case the lever 40 is at the forward position, or the same with its sign changed to minus in the case of the backward position, or the value of "0" invalidating the compensatory speed ratio data EX in the case of the neutral.

Now, the operation and effect of the seventh embodiment of the foregoing structure will be described.

When the vehicle is running through operation of the running pedal 1 only, the step-on-angle detector 10 supplies the vehicle acceleration signal SG1 to the running function generator 13 and the swash plate function generator 21, and further to the vehicle speed arithmetic unit 33. The swash plate function generator 21 converts the step-on-degree of the running pedal 1 in accordance with the foregoing function to the speed ratio data e and feeds it to the multiplier 22, whereas the vehicle speed arithmetic unit 33 supplies the vehicle speed data v based on the step-on-degree of the running pedal 1 to the arithmetic unit 24.

On the other hand, because the comparator 17 has judged that the maximum revolution data A from the selector circuit 16 is identical with the data A1 from the running function generator 13, the inverse proportional arithmetic unit 18 supplies the ratio of value "1" to the multiplier 22. Thus, the multiplier 22 supplies the speed ratio data e without modification, treating it as the revolution compensatory speed ratio data E (=e), to the arithmetic unit 28.

On the other hand, the arithmetic unit 24 computes the difference between the vehicle speed data v based on the step-on-degree of the running pedal 1 and the current/actual vehicle speed V based on the detection signal from the vehicle speed detector 25 to obtain the vehicle speed variate data $\Delta v(=V-v)$, and feeds it to the converter 27. The converter 27 converts it to the revisory inclination angle value $\Delta e$ and supplies it to the integrator 35. Here, because the comparator 17 has judged that the data A from the selector circuit 16 is identical with the data A1 from the running function generator 13, the integrator 35 does not perform computation and supplies the value of "0" to the following arithmetic unit 28. In turn, the arithmetic unit 28 computes the compensatory speed ratio EX (=E−E1) from the corrective inclination angle value E1 and the revolution compensatory speed ratio data E and feeds it to the swash plate actuator 9.

Accordingly, in this case, the speed ratio can be controlled on the basis of the step-on-degree of the running pedal 1. In case the output of the integrator 35 is not zero and if the vehicle speed is altered by some external causes, the speed ratio at that moment is adjusted on the basis of the revisory inclination angle value $\Delta e$ to control the vehicle speed V.

Then, in case the lift lever 2 has been manipulated while the vehicle is running, the revolution data A1 is applied to the selector circuit 16, similarly to the foregoing fourth embodiment. On the other hand, the lift speed signal SG2 is applied to the lift function generator 14. The lift function generator 14 converts the signal SG2 to the revolution data A2 and supplies to the selector circuit 16.

The selector circuit 16 selects the larger one, i.e., A2, out of two revolution data A1 and A2, treating it as the maximum revolution data A, feeds it to the throttle actuator 8, thereby causing the throttle actuator 8 to control the revolution of the engine 4. Thus, in this case, the revolution rate N of the engine increases in response to the manipulation degree of the lift lever 2. In turn, in response thereto the vehicle speed V will go up.

On the other hand, because the two data applied to the comparator 17 differ from each other, the inverse proportional arithmetic unit 18 computes the revolution rate n of the engine based on the step-on-degree of the running pedal 1 on the basis of the revolution data A1 for running, and the revolution rate N at that moment of the engine 4 on the basis of the detection signal from the revolution detector 20. Then, the inverse proportional arithmetic unit 18 computes the ratio (=n/N) of both revolution rates n, N and feeds this to the multiplier 22.

The multiplier 22 multiplies the speed ratio data e based on the step-on-degree of the running pedal 1 by the above ratio (=n/N) to obtain the revolution compensatory speed ratio data E (=e·(n/N)), and feeds this to the arithmetic unit 28.

On the other hand, the arithmetic unit 24 computes the difference between the vehicle speed data v based on the step-on-degree of the running pedal 1 and the current/actual vehicle speed V based on the detection signal from the vehicle speed detector 25 to obtain the vehicle speed variate data $\Delta v$ (=V−v), and feeds this to the converter 27. The converter 27 converts it to the revisory inclination angle data $\Delta e$ and supplies it to the integrator 35. On the other hand, because the two data A1 and A2 applied to the comparator 17 differ from each other, the integrator 35 converts the above data $\Delta e$ to the corrective inclination angle value E1 at a gain in response to the signal, representing the rate of the cargo handling operation and given from the comparator 17, and supplies this to the arithmetic unit 28. In turn, the arithmetic unit 28 computes the compensatory speed ratio EX (=E−E1) from the corrective inclination angle value E1 and the revolution compensatory speed ratio data E (=e·(n/N)), and supplies to the swash plate actuator 9 via the sign converter 29.

The swash plate actuator 9 adjusts the inclination angle of the swash plate on the basis of the speed ratio data EX, thereby to change the speed ratio of the continuously variable transmission 5 so that the vehicle speed V will be maintained at a level in response to the vehicle speed v based on the step-on-degree of the running pedal 1. Accordingly, when the cargo handling operation has been performed while the engine is running, a variation in vehicle speed caused by the cargo handling can be compensated for without need of a high level of skill.

Accordingly, the present invention has the advantage that even if the correction achieved by the inverse proportional arithmetic unit 18 and the multiplier 22 were not high in precision, the succeeding stage achieves the correction surely, thus, adjusting of the control device becomes easy.

Similarly, even if the lift lever 2 and/or tilt lever 3 is manipulated with the vehicle is stopped, and even if the tilt lever 3 is manipulated while the vehicle is running, the optimum revolution data A1 through A3 are given from the respective function generators 13 through 15, by which the engine 4 is rotation-controlled under the optimum conditions. In addition, on the basis of the ratio (=n/N) given from the inverse proportional arithmetic unit 18 and the vehicle speed variate data $\Delta v$ given from the arithmetic unit 24, the compensatory speed ratio data EX is computed, by which the speed ratio of the continuously variable transmission 5 is controlled.

Therefore, in accordance with this embodiment, even if the vehicle speed V fluctuates due to any of internal causes (fluctuation of the engine revolution rate) and external cause (external load), such fluctuation of vehicle speed can surely be compensated for (before it becomes appreciable in the case of internal causes).

In modification of the seventh embodiment, the system may be put into practice with an increased number of function generators, inclusive of generators 13 through 15 and 21, or with a decreased number of function generators. In case the revolution data A1 through A3 are given concurrently, the selector circuit 16 may sum up these revolution data and use the sum as the resultant revolution data.

The continuously variable transmission 5 may be of the V-belt stepless type. The running pedal 1, lift lever 2, and tilt lever 3 may be coupled mechanically to the throttle of the engine 4 by means of link, wire, etc.

Further, this embodiment may be applied to a vehicle equipped with the seesaw type running pedal 1.

In addition, this embodiment may be realized by replacing the engine 4 by diesel engine, gasoline engine, motor, etc. and the throttle actuator 8 may be integral with the engine 4.

Figure 14:
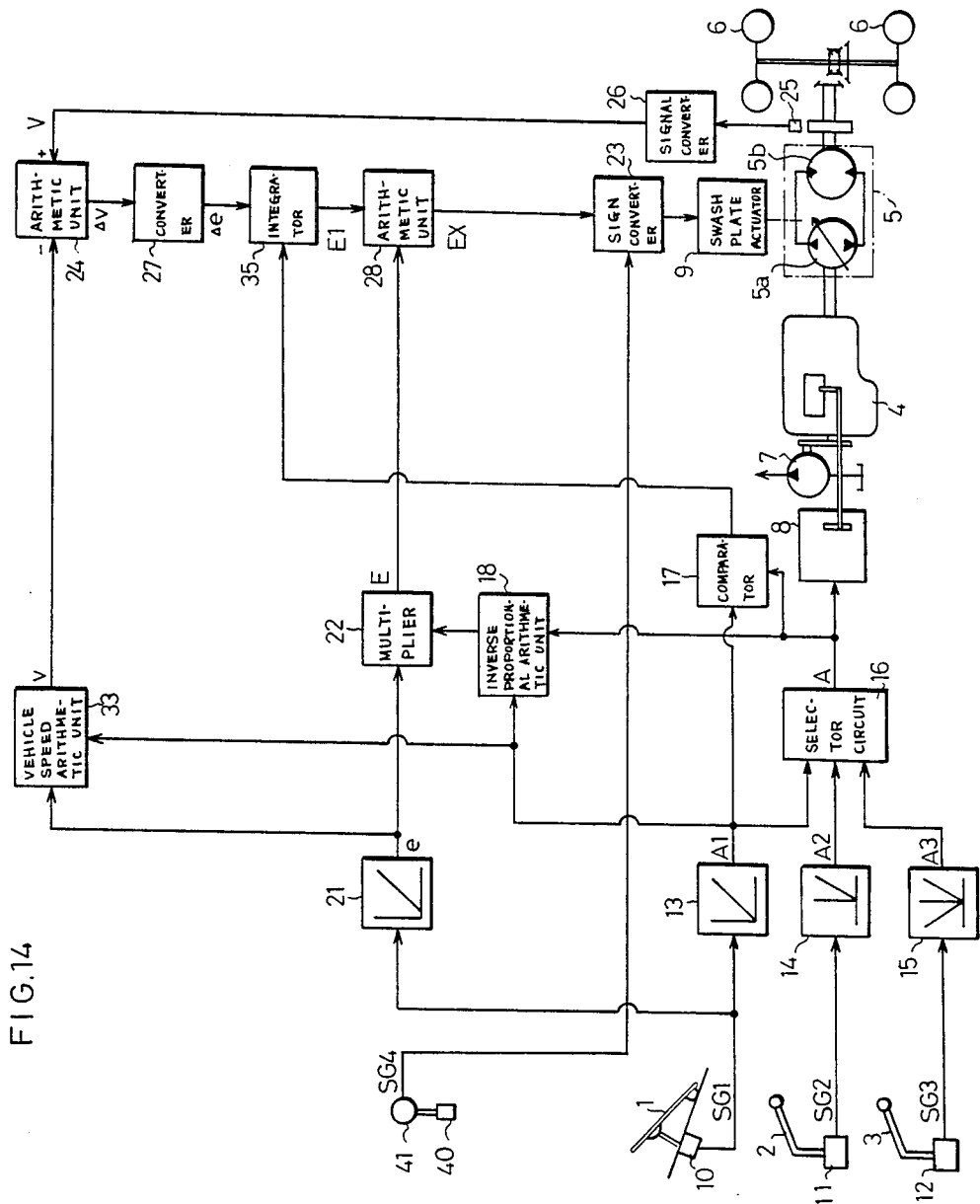
FIG. 14 is an electric block circuit diagram for explanation of an eighth embodiment of the present invention.

The eighth embodiment is the one realized in the form of the fork lift truck as shown in FIG. 14, similar to the seventh embodiment, but, differs from the seventh embodiment in that the engine 4 is the all speed governor type diesel engine.

The feature of the all speed governor type diesel engine is that the degree of throttle opening is substantially in proportion to the engine revolution. Accordingly, the engine revolution N can be computed through conversion of the foregoing revolution data A1 through A3.

That is, the compensatory speed ratio data E (=e·n/N) can be put as E=e·(the revolution data A1 for running)/(the maximum revolution data A).

Now, the eighth embodiment utilizing the feature of the all speed governor type diesel engine will be described with reference to FIG. 14.

The eighth embodiment does not need the signal converter 19 and revolution detector 29 included in the seventh embodiment. The inverse proportional arithmetic unit 18 receives always the revolution data A1 for running and the maximum revolution data A given from the selector circuit 16, computes on the basis of both data the ratio (=A1/A) and supplies to the multiplier 22. Similarly to the seventh embodiment, the multiplier 22 computes the revolution compensatory speed ratio data E (=e·(A1/A)) and controls the speed ratio of the continuously variable transmission 5 through the arithmetic unit 28, sign converter 29, and swash plate actuator 9.

Accordingly, the eighth embodiment can produce the effects similar to that of the seventh embodiment, and does not need the signal converter 19 and revolution detector 20, so, the electronic circuit can be simplified, thus, this embodiment is very advantageous from the viewpoint of costs and designing.

In this embodiment, when the received revolution data have the relation, A1=A, the comparator 17 supplies a computation-suspension signal to the integrator 35. Thus, in the case of running only, the speed ratio can be determined merely from the step-on degree of the running pedal 1.

Figure 15:
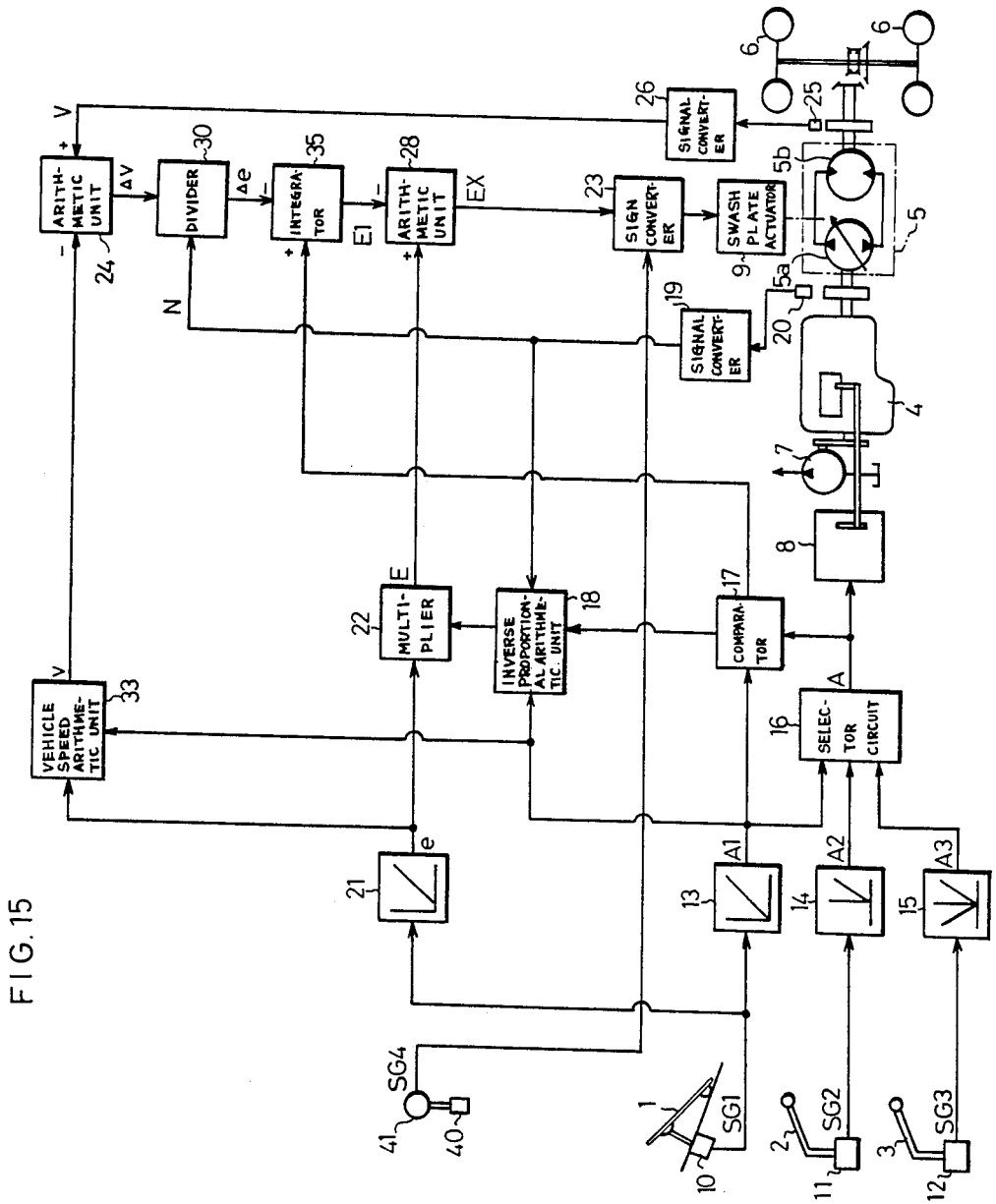
FIG. 15 is an electric block circuit diagram for explanation of a ninth embodiment of the present invention.

The system shown in FIG. 15 includes a divider 30 in place of the converter 27 included in the seventh embodiment, that receives the engine revolution and converts Δv to Δe. Accordingly, this system has the advantage that the property of convergency of the correction signal can be improved.

Accordingly, though the revolution detector 20 for detecting the revolution N of the engine 4, its signal converter 19, and the divider 32 for dividing the vehicle speed variate data Δv by the revolution N are needed as shown in FIG. 15, by these units the system shown in FIG. 15 can improve the property of convergency of the feedback in comparison to the seventh embodiment.

Incidentally, the compensatory speed ratio data EX is computed on the basis of the revolution ratio and/or the ratio of the revolution data of the engine in the seventh, eighth and ninth embodiments. In this connection, in the case of the swash plate type variable volume hydraulic pump and the swash plate type hydraulic motor, the operation efficiency decreases under the influence of temperature and as the angle of the swash plate becomes small, thus no one can say in every case that the angle of the swash plate is proportional to the speed ratio. However, even in such a case, the vehicle speed can be maintained constant because its correction operation is achieved by the correction circuit in the rear stage of the electronic circuit.

As apparent from the description hereinabove, in accordance with the seventh, eighth and ninth embodiments and their modifications, when a cargo handling operation is performed while the vehicle is running, the engine throttle is automatically drive-controlled, whereby troublesome engine manipulation becomes unnecessary at the time of cargo handling. Further, because the speed ratio is controlled so as not to cause a change in vehicle speed if the running pedal is kept at one position even if the engine revolution/rate changes in responses to cargo handling operation, the cargo handling operation does not influence on the vehicle speed.

Since it is apparent that any one skilled in the art can realize a wide variety of embodiments without departing from the scope and spirit of this invention, this invention should not be limited to the specific embodiments described hereinabove, except for those delineated by the accompanying claims.

What is claimed is:

1. A control device for a cargo handling vehicle equipped with a cargo handling device in which a cargo handling hydraulic pump of said cargo handling device is driven by a power plant and the vehicle is driven by the same power plant via a continuously variable transmission, comprising
  (a) vehicle drive means,
  (b) a first operation means for computing the relation of variation between a value in response to speed of said power plant based on the operation of the cargo handling device and a value corresponding to the speed of said power plant when the cargo handling device is not in operation,
  (c) a second operation means for computing, on the basis of said relation of variation in the values in response to the speed of said power plant, a speed ratio of said continuously variable transmission to compensate for fluctuation in vehicle speed during operation of said cargo handling device, and
  (d) a control means for controlling the speed ratio of said continuously variable transmission on the basis of the computed speed ratio,
  all of said means being in operation while the vehicle is running.

2. A control device as set forth in claim 1, wherein said first operation means comprises a ratio operating means for computing the ratio between the value in response to the power plant during operation of said cargo handling device and the value in response to the power plant speed when the cargo handling device is not in operation, and said second operation means is an operating means for computing the speed ratio of said continuously variable transmission on the basis of the computed ratio.

3. A control device for a cargo handling vehicle as set forth in claim 2, wherein said power plant speed ratio computing operation means and said variable transmission speed ratio computing operation means consist of a single electronic control device.

4. A control device as set forth in claim 2, including further, a selector means for selecting and outputting one of the computed power plant speed values based.

5. A control device for a cargo handling vehicle as set forth in claim 4, wherein said selector means is a selector circuit for selecting and outputting the sum of the power plant speed values.

6. A control device of a cargo handling vehicle as set forth in claim 4, wherein said selector means is a selector circuit for selecting and outputting a maximum power plant speed value.

7. A control device as set forth in claim 4, wherein said power plant speed ratio computing operation means is an inverse proportional arithmetic unit including a power plant speed ratio computing means, wherein said arithmetic unit receives the value selected by said selector means and the power plant speed value from said vehicle drive means, computes a ratio on the basis of both said values, and feeds said ratio to said speed ratio computing operation means.

8. A control device for a cargo handling vehicle as set forth in claim 4, including further a comparator means which compares the output from said selector means with the power plant speed values from said vehicle drive means and supplies a signal representing the presence/absence of cargo handling operation to said speed ratio computing operation means.

9. A control device for a cargo handling vehicle as set forth in claim 8, wherein said speed ratio computing operation means is an inverse proportional arithmetic unit which, when the signal representing the presence of cargo handling operation is being given, computes a result on the basis of the power plant speed during the cargo handling operation and the power plant speed when the cargo handling device is not in operation, and supplies said result to said speed ratio computing operation means of said continuously variable transmission and, when the cargo handling operation signal is absent, always sets the result to "1".

10. A control device for cargo handling vehicle as set forth in claim 9, wherein the power plant during cargo handling is computed on the basis of a signal detected by a speed detector for detecting the said power plant, the power plant speed when the cargo handling device is not in operation is computed on the basis of the power plant speed data, and the computation of the ratio is achieved by the use of these computed speeds.

11. A control device as set forth in claim 2, wherein said speed ratio computing operation means of said continuously variable transmission is a multiplier which receives the computed power plant speed ratio and a speed ratio value based on the operation of the vehicle drive means, multiplies them into a compensatory speed ratio and supplies said compensatory speed ratio to said speed ratio controlling means of said continuously variable transmission.

12. A control device as set forth in claim 11, wherein the speed ratio data is provided by a continuously variable transmission function generator.

13. A control device as set forth in claim 11, wherein said speed ratio controlling means of said continuously variable transmission is a function generator for outputting the speed ratio data.

14. A control device as set forth in claim 11, wherein said speed ratio controlling means of said continuously variable transmission comprises a sign converter for controlling said continuously variable transmission on the basis of the computed speed ratio of said continuously variable transmission, and a function generator for outputting the speed ratio data.

15. A control device as set forth in claim 14, wherein said sign converter ouputs the speed ratio data from said speed ratio computing operation means on the basis of a position signal of a forward/backward lever of the cargo handling vehicle.

16. A control device for a cargo handling vehicle as set forth in claim 1, wherein said first operation means comprises a difference operating means for computing the difference of a vehicle speed based on the operation of said cargo handling device, and said second operation means is an operating means for computing the speed ratio of said continuously variable transmission on the basis of said computed difference.

17. A control device for a cargo handling vehicle as set forth in claim 16, including futher a computing means which computes on the basis of the operation of said vehicle drive means a vehicle speed data based on the vehicle speed that might be obtained when said vehicle drive means operates when the cargo handling device is not in operation.

18. A control device for a cargo handling vehicle as set forth in claim 17, wherein said vehicle speed difference computing operation means is an arithmetic unit which receives the vehicle speed data from said vehicle speed data computing means and the actual vehicle speed at that moment, detects the difference therebetween, and feeds a difference signal to said speed ratio computing operation means of said continuously variable transmission.

19. A control device for a cargo handling vehicle as set forth in claim 18, wherein the actual vehicle speed is computed on the basis of the signal detected by a vehicle speed detector for detecting the speed on the output side of said continuously variable transmission.

20. A control device for a cargo handling vehicle as set forth in claim 18, wherein said vehicle speed data computing means is a vehicle speed arithmetic unit which computes the vehicle speed data from the power plant revolution data and the speed ratio data based also on the operation of said vehicle drive means.

21. A control device for a cargo handling vehicle as set forth in claim 20, wherein the speed ratio data is given by a continuously variable transmission function generator through conversion of driving acceleration signal of said vehicle drive means.

22. A control device for a cargo handling vehicle as set forth in claim 18, wherein said vehicle speed data computing means is a vehicle speed function generator which converts a driving acceleration signal to the vehicle speed data.

23. A control device for a cargo handling vehicle as set forth in claim 16, wherein said speed ratio computing operation means of said continuously variable transmission is composed of an integrator and an arithmetic unit, said integrator receiving the signal from said vehicle speed difference computing operation means and feeding the signal to said arithmetic unit.

24. A control device for a cargo handling vehicle as set forth in claim 23, including further, between said integrator and both said vehicle drive means and said cargo handling device, a selector means for selecting and outputting one data among the plural power plant speed data based on the operation of both said vehicle drive means and said cargo handling device.

25. A control device for a cargo handling vehicle as set forth in claim 24, wherein said selector means is a selector circuit for selecting and outputting a maximum speed data from among the power plant speed data.

26. A control device for a cargo handling vehicle is set forth in claim 24, wherein said selector means is a selector circuit for selecting and outputting the sum of the power plant speed data.

27. A control device for a cargo handling vehicle as set forth in claim 24, including further, between said integrator and said power plant speed data selecting selector means, a comparator means which supplies to said integrator the signal representing the presence/absence of cargo handling on the basis of the one data from said selector means and the power plant speed data from said vehicle drive means and, when cargo handling is being performed, a signal representing the rate of cargo handling.

28. A control device for a cargo handling vehicle as set forth in claim 27, wherein said integrator integrates a signal for said speed ratio controlling means at a gain in response to the signal representing the rate of cargo handling from said comparator means and supplies to said arithmetic unit when the signal representing that cargo handling is taking place is being given from said comparator means and, when a signal representing the no cargo handling is taking place is being given, supplies the value of "0" to said arithmetic unit.

29. A control device for a cargo handling vehicle as set forth in claim 16, wherein said speed ratio controlling means of said continuously variable transmission is a sign converter which controls said continuously variable transmission on the basis of the computed speed ratio of said continuously variable transmission.

30. A control device for a cargo handling vehicle as set forth in claim 29, wherein said sign converter converts the sign of the speed ratio data from said speed ratio computing operation means of said continuously variable transmission on the basis of a position detection signal of a forward/backward lever of the cargo handling vehicle and outputs the same.

31. A control device for a cargo handling vehicle as set forth in claim 16, including further, between said integrator and said vehicle speed difference computing operation means, a converter means for converting the vehicle speed difference data from said vehicle speed difference computing operation means to a signal for said speed ratio controlling means of said continuously variable transmission and supplying said signal for speed ratio controlling means to said integrator.

32. A control device for a cargo handling vehicle as set forth in claim 31, wherein said continuously variable transmission is composed of a variable volume hydraulic pump and a hydraulic motor, said variable volume hydraulic pump being driven by said power plant, and said hydraulic motor being rotated by the working oil supplied through driving of said variable volume hydraulic pump.

33. A control device for a cargo handling vehicle as set forth in claim 32, wherein said converter means is a converter which converts the vehicle speed difference data to a revisory inclination angle value for revision of a swash plate angle of said variable volume hydraulic pump, so as to recover the original vehicle speed by changing the speed ratio by a changed fraction of the vehicle speed.

34. A control device for a cargo handling vehicle as set forth in claim 32, wherein said arithmetic unit corrects the speed ratio data based on the operation of said vehicle drive means by revisory inclination angle value for revision of a swash plate angle of said variable volume hydraulic pump to obtain a compensatory speed ratio and supplies said compensatory speed ratio to said speed ratio controlling means of said continuously variable transmission.

35. A control device for a cargo handling vehicle as set forth in claim 31, wherein said converter means is a divider for dividing the vehicle speed variate data by the power plant speed.

36. A control device for a cargo handling vehicle as set forth in claim 35, wherein said divider performs its computation on the basis of the signal detected by said power plant speed detector.

37. A control device for a cargo handling vehicle as set forth in claim 16, wherein said vehicle speed difference computing operation means, said speed ratio computing operation means of said continuously variable transmission, and said speed ratio controlling means of said continuously variable transmission consist of a single electronic control device.

38. A control device as set forth in claim 1, wherein said first operation means computes a value in response to the power plant speed on the basis of the value in response to the power plant speed when no cargo handling manipulation is taking place.

39. A control device for a cargo handling vehicle as set forth in claim 1, wherein said first operation means comprises a ratio operating means for computing the ratio between the value in response to the power plant speed based on the operation of said cargo handling device and the value in response to the power plant speed when the cargo handling device is not in operation, and a difference operating means for computing a difference of a vehicle speed based on the operation of said cargo handling device, said second operation means is an operating means for computing the speed ratio of said continuously variable transmission on the basis of both the ratio of values in response to the power plant speed and the difference of the vehicle speed.

40. A control device for a cargo handling vehicle as set forth in claim 39, including further, between said first power plant speed radio computing operation means and both said vehicle drive means and said cargo handling device, a selector means for selecting and outputting one data from the plural power plant speed data based on the manipulation of both said drive means and said cargo handling device.

41. A control device for a cargo handling vehicle as set forth in claim 40, wherein said power plant speed ratio computing operation means is an inverse proportional arithmetic unit which receives the data selected by said selector means and the power plant speed data from said vehicle drive means, computes the ratio therebetween on the basis of these data, and supplies said ratio to said speed ratio computing operation means of said continuously variable transmission.

42. A control device for a cargo handling vehicle as set forth in claim 40, including further, between said power plant speed ratio computing operation means and said selector means, a comparator means which compares the one data from said selector means with the power plant speed data from said vehicle drive means and supplies the signal reprsenting the presence/absence of cargo handling to said speed ratio computing operation means.

43. A control device for a cargo handling vehicle as set forth in claim 42, wherein said power plant speed ratio computing operation means is an inverse proportional arithmetic unit which, when a signal representing the presence of cargo handling is being given from said comparator means, computes on the basis of the power plant speed during cargo handling device is not in operation the ratio therebetween and feeds that ratio to said speed ratio computing operation means of said continuously variable transmission and, when the cargo handling operation signal is absent, always sets that ratio to "1".

44. A control device for a cargo handling vehicle as set forth in claim 43, wherein the power plant speed during cargo handling is computed on the basis of a signal detected by a speed detector, and the power plant speed when the cargo handling device is not in operation is computed on the basis of the power plant speed data.

45. A control device for a cargo handling vehicle as set forth in claim 39, including further a computing means which computes on the basis of the operation of said vehicle drive means a vehicle speed data based on the vehicle speed that might be obtained when said vehicle drive means were were operated while the cargo handling means is not in operation.

46. A control device for a cargo handling vehicle as set forth in claim 45, wherein said vehicle speed difference computing operation means is an arithmetic unit which receives the vehicle speed data from said vehicle speed data computing means and the actual vehicle speed at that moment, detects the difference therebetween, and supplies a different signal to said speed ratio computing operation means of said continuously variable transmission.

47. A control device for a cargo handling vehicle as set forth in claim 39, wherein said speed ratio computing operation means of said continuously variable transmission is composed of a multiplier, an integrator, and an arithmetic unit, said multiplier receiving the computed power plant speed ratio and the speed ratio data based on the operation of said vehicle drive means, said integrator receiving the computed vehicle speed difference, said multiplier and said integrator supplying the received signals to said arithmetic unit, and said arithmetic unit supplying the received signals to said speed ratio controlling means of said continuously variable transmission.

48. A control device for a cargo handling vehicle as set forth in claim 47, wherein the speed ratio data is provided by a continuously variable transmission function generator through conversion of a driving acceleration signal of said vehicle drive means.

49. A control device for a cargo handling vehicle as set forth in claim 47, including further, between said integrator of said speed ratio computing operation means of said continuously variable transmission and both said vehicle drive means and said cargo handling device, a selector means for selecting and outputting one data from the power plant speed data based on the manipulation of both said vehicle drive means and said cargo handling device.

50. A control device for a cargo handling vehicle as set forth in claim 49, including further, between said integrator of said speed ratio computing operation means of said continuously variable transmission and said power plant speed data selecting selector means, a comparator means which supplies to said integrator, a signal representing the presence/absence of cargo handling on the basis of the cargo handling on the basis of the data from said selector means and the power plant speed data from said vehicle drive means and, when cargo handling is being performed, a signal representing the rate of cargo handling.

51. A control device for a cargo handling vehicle as set forth in claim 39, wherein said speed ratio controlling means of said continuously variable transmission is a sign converter for controlling said continuously variable transmission on the basis of the computed speed ratio of said continuously variable transmission.

52. A control device for a cargo handling vehicle as set forth in claim 51, wherein said sign converter converts the sign of the speed ratio data from said speed ratio computing operation means of said continuously variable transmission on the basis of a position signal fo a forward/backward lever of the cargo handling vehicle and outputs the same.

53. A control device for a cargo handling vehicle as set forth in claim 39, wherein said first operation means, said second operation means, said speed ratio computing operation means of said continuously variable transmission, and said speed ratio controlling means of aid continuously variable transmission consist of a single electronic control device.

* * * * *

UNITED STATES PATENT AND TRADEMARK OFFICE
CERTIFICATE OF CORRECTION

PATENT NO. : 4,727,490
DATED : February 23, 1988
INVENTOR(S) : Narita et al

It is certified that error appears in the above-identified patent and that said Letters Patent is hereby corrected as shown below:

Column 1, line 37, delete "a" and insert --great--.

Column 2, line 55, delete "of" and insert --before--.

Column 2, line 55, italicize "e".

Column 2, line 56, italicize "n".

Column 2, line 57, italicize "E".

Column 2, line 58, italicize "N".

Column 3, line 4, after "before", insert --the--.

Column 4, line 42, italicize "e".

Column 4, line 43, italicize "n".

Column 4, line 44, italicize "E".

Column 4, line 45, italicize "N".

Column 6, line 13, correct spelling --variable--

Column 7, line 53, italicize "n", "N".

Column 7, line 63, italicize "e".

Column 13, line 34, correct spelling of --manipulation--.

UNITED STATES PATENT AND TRADEMARK OFFICE
CERTIFICATE OF CORRECTION

PATENT NO.  : 4,727,490
DATED       : February 23, 1988
INVENTOR(S) : Narita et al It is certified that error appears in the above-identified patent and that said Letters Patent is hereby corrected as shown below:

Column 16, line 66, after "speed", delete "forward/backward" and insert --detector--.

Column 16, line 67, delete "detection" and insert --forward/backward--.

Column 21, line 65, delete the slant symbol "/" between "revolution rate".

Column 24, line 49, delete "is" and insert --as--.

Column 25, line 2, delete "the" and insert --that--.

Signed and Sealed this

Twenty-eighth Day of February, 1989

Attest:

DONALD J. QUIGG

*Attesting Officer*            *Commissioner of Patents and Trademarks*